US010948597B2

(12) United States Patent
Nagai

(10) Patent No.: US 10,948,597 B2
(45) Date of Patent: Mar. 16, 2021

(54) TIME-OF-FLIGHT DISTANCE MEASUREMENT DEVICE

(71) Applicant: DENSO CORPORATION, Kariya (JP)

(72) Inventor: Toshiaki Nagai, Kariya (JP)

(73) Assignee: DENSO CORPORATION, Kariya (JP)

( * ) Notice: Subject to any disclaimer, the term of this patent is extended or adjusted under 35 U.S.C. 154(b) by 945 days.

(21) Appl. No.: 15/502,541

(22) PCT Filed: Aug. 26, 2015

(86) PCT No.: PCT/JP2015/004280
§ 371 (c)(1),
(2) Date: Feb. 8, 2017

(87) PCT Pub. No.: WO2016/031240
PCT Pub. Date: Mar. 3, 2016

(65) Prior Publication Data
US 2017/0227643 A1    Aug. 10, 2017

(30) Foreign Application Priority Data

Aug. 29, 2014  (JP) ................................ 2014-175769

(51) Int. Cl.
*G01S 17/36* (2006.01)
*G01S 7/493* (2006.01)
*G01S 7/4914* (2020.01)
*G01S 7/4915* (2020.01)
*G01S 7/497* (2006.01)

(52) U.S. Cl.
CPC .............. *G01S 17/36* (2013.01); *G01S 7/493* (2013.01); *G01S 7/4914* (2013.01); *G01S 7/4915* (2013.01); *G01S 7/497* (2013.01)

(58) Field of Classification Search
CPC ...... G01S 17/36; G01S 7/4914; G01S 7/4915; G01S 7/493; G01S 7/497
USPC .......................................................... 356/10
See application file for complete search history.

(56) References Cited

U.S. PATENT DOCUMENTS

| 6,825,455 | B1 | 11/2004 | Schwarte |
| 6,919,549 | B2 | 7/2005 | Bamji et al. |
| 7,462,808 | B2 | 12/2008 | Lustenberger et al. |
| 7,719,662 | B2 | 5/2010 | Bamji et al. |
| 2007/0057209 | A1 | 3/2007 | Kurihara et al. |
| 2008/0239466 | A1 | 10/2008 | Buettgen |
| 2009/0014658 | A1 | 1/2009 | Cottier et al. |

(Continued)

FOREIGN PATENT DOCUMENTS

DE    10 2005 056 774 A1    5/2007
JP        2012-209380 A       10/2012

*Primary Examiner* — Daniel L Murphy
(74) *Attorney, Agent, or Firm* — Posz Law Group, PLC

(57) ABSTRACT

In a time-of-flight distance measurement device, a light receiving device is driven by a sequence having a matrix of a phase number n, a value sampled on the basis of the n rank matrix with respect to the phase number n is linearly calculated, and a waveform equivalent to the waveform sampled in a 1/n step is detected. A linear operation is performed on a sampled value based on the matrix with the rank n with respect to the phase number n, thereby being capable of restoring the waveform equivalent to the waveform sampled in the 1/n steps, and determining whether the shape of the light emission waveform is normal, or not. As a result, the shape of the light emission waveform can be monitored without interrupting a distance measurement.

24 Claims, 29 Drawing Sheets

(56) References Cited

U.S. PATENT DOCUMENTS

2011/0101241 A1 5/2011 Cottier et al.
2011/0176709 A1 7/2011 Park et al.
2012/0013887 A1 1/2012 Xu et al.
2012/0209380 A1 8/2012 Rankin
2014/0203389 A1 7/2014 Neukom et al.

| | | | | | | | | | | | | | | | | | | |
|---|---|---|---|---|---|---|---|---|---|---|---|---|---|---|---|---|---|---|
| TG1-1 | 1 | 1 | 1 | 1 | 1 | 1 | 1 | 0 | 0 | 0 | 0 | 0 | 0 | 0 | 0 | 0 | 1 | 1 |
| TG2-1 | 0 | 0 | 0 | 0 | 0 | 0 | 0 | 0 | 1 | 1 | 1 | 1 | 1 | 1 | 1 | 0 | 0 | 0 |
| TG1-2 | 0 | 0 | 0 | 0 | 1 | 1 | 1 | 1 | 1 | 1 | 1 | 0 | 0 | 0 | 0 | 0 | 0 | 0 |
| TG2-2 | 1 | 1 | 1 | 0 | 0 | 0 | 0 | 0 | 0 | 0 | 0 | 0 | 1 | 1 | 1 | 1 | 1 | 1 |
| TG1-3 | 0 | 0 | 1 | 1 | 1 | 1 | 1 | 1 | 1 | 0 | 0 | 0 | 0 | 0 | 0 | 0 | 0 | 0 |
| TG2-3 | 1 | 0 | 0 | 0 | 0 | 0 | 0 | 0 | 0 | 0 | 1 | 1 | 1 | 1 | 1 | 1 | 1 | 0 |
| TG1-4 | 0 | 0 | 0 | 0 | 0 | 0 | 1 | 1 | 1 | 1 | 1 | 1 | 0 | 0 | 0 | 0 | 0 | 0 |
| TG2-4 | 1 | 1 | 1 | 1 | 1 | 0 | 0 | 0 | 0 | 0 | 0 | 0 | 0 | 0 | 1 | 1 | 1 | 1 |
| TG1-5 | 0 | 1 | 1 | 1 | 1 | 1 | 1 | 1 | 0 | 0 | 0 | 0 | 0 | 0 | 0 | 0 | 0 | 1 |
| TG2-5 | 0 | 0 | 0 | 0 | 0 | 0 | 0 | 0 | 0 | 1 | 1 | 1 | 1 | 1 | 1 | 1 | 0 | 0 |
| TG1-6 | 0 | 0 | 0 | 0 | 0 | 1 | 1 | 1 | 1 | 1 | 1 | 1 | 0 | 0 | 0 | 0 | 0 | 0 |
| TG2-6 | 1 | 1 | 1 | 1 | 0 | 0 | 0 | 0 | 0 | 0 | 0 | 0 | 1 | 1 | 1 | 1 | 1 | 1 |
| TG1-7 | 0 | 0 | 0 | 1 | 1 | 1 | 1 | 1 | 1 | 1 | 0 | 0 | 0 | 0 | 0 | 0 | 0 | 0 |
| TG2-7 | 1 | 1 | 0 | 0 | 0 | 0 | 0 | 0 | 0 | 0 | 0 | 1 | 1 | 1 | 1 | 1 | 1 | 1 |
| TG1-8 | 0 | 0 | 0 | 0 | 0 | 0 | 0 | 1 | 1 | 1 | 1 | 1 | 1 | 1 | 0 | 0 | 0 | 0 |
| TG2-8 | 1 | 1 | 1 | 1 | 1 | 1 | 0 | 0 | 0 | 0 | 0 | 0 | 0 | 0 | 1 | 1 | 1 | 1 |

NOTATION IN WHICH WAVEFORMS OF
TG1 AND TG2 ARE OMITTED

– – – IDEAL WAVEFORM
——— ACTUAL WAVEFORM

TIME-OF-FLIGHT DISTANCE MEASUREMENT DEVICE

CROSS-REFERENCE TO RELATED APPLICATIONS

The present application is a U.S. national stage of International patent application No. PCT/JP2015/004280 filed on Aug. 26, 2015 and is based on Japanese patent application No. 2014-175769 filed on Aug. 29, 2014, the content of which is incorporated herein by reference.

TECHNICAL FIELD

The present disclosure relates to a time-of-flight distance measurement device which emits a modulated light toward a space, receives an incident light including a reflected light obtained by reflecting the modulated light on a target object to distribute charges to multiple storage capacitors and accumulate the distributed charges, and calculates a distance from the subject device to the target object with the use of a sampled value.

BACKGROUND ART

As a device for measuring a distance from a subject device to a target object without contact, a time-of-flight (TOF: time of flight) distance measurement device is provided. The time-of-flight distance measurement device emits a modulated light (distance measuring light) toward a space, and receives an incident light including a reflected light obtained by reflecting the modulated light on a target object. The time-of-flight distance measurement device distributes charges corresponding to the received incident light to multiple storage capacitors and accumulates the distributed charges, and calculates a distance from the subject device to the target object with the use of a sampled value (for example, refer to Patent Literatures 1 and 2).

In addition, a technique is disclosed in which the distance is actually measured for a target object whose distance is known and a correction is performed by creating a lookup table (LUT) based on the distance measurement result (for example, refer to Patent Literatures 3 and 4).

PRIOR ART LITERATURES

Patent Literature

Patent Literature 1: JP-A-2006-84430
Patent Literature 2: U.S. Pat. No. 6,825,455B1
Patent Literature 3: U.S. Pat. No. 7,719,662B2
Patent Literature 4: JP-T-2013-534639

SUMMARY OF INVENTION

It is an object of the present disclosure to provide a time-of-flight distance measurement device capable of monitoring a shape of a light emission waveform without interrupting a distance measurement and allowing an appropriate countermeasure according to the result.

According to a first aspect of the present disclosure, a light emitting device emits a modulated light toward a space, the modulated light being modulated in a pattern having a repetitive period. A light receiving device distributes a charge to a plurality of storage capacitors to store the charge, the charge corresponding to an incident light including a reflected light obtained by reflecting the modulated light on a target object. A control unit controls the light receiving device. A signal processing unit calculates a distance from a subject device to the target object by using a value sampled by the light receiving device. In this case, the control unit drives the light receiving device according to a sequence having a matrix of a phase number n (n being a natural number). Further, the signal processing unit linearly calculates the value sampled by the light receiving device based on a rank n matrix with respect to the phase number n, and detects a waveform equivalent to a waveform sampled at a 1/n step.

As a result, a linear operation is performed on a sampled value based on a matrix with a rank n with respect to a phase number n, thereby being capable of restoring a waveform equivalent to a waveform sampled in 1/n steps, and determining whether the shape of the light emission waveform is normal, or not. For example, when the shape of the light emission is abnormal, an alarm is output, thereby being capable of appropriately coping with a result of monitoring the shape of the light emission waveform. In addition, values that affect errors such as a duty cycle or a rising time can be detected.

According to a second aspect of the present disclosure, a light emitting device emits a modulated light toward a space, the modulated light being modulated in a pattern having a repetitive period. A light receiving device distributes a charge to a plurality of storage capacitors to store the charge, the charge corresponding to an incident light including a reflected light obtained by reflecting the modulated light on a target object. A control unit controls the light receiving device. A signal processing unit calculates a distance from a subject device to the target object by using a value sampled by the light receiving device. In this case, the control unit drives the light receiving device according to a sequence having a matrix of a phase number n (n being a natural number). Further, the signal processing unit linearly calculates the value sampled by the light receiving device based on a rank n−1 matrix with respect to the phase number n, and detects a waveform equivalent to a differential waveform sampled at a 1/n step.

As a result, a linear operation is performed on a sampled value based on a matrix of a rank n−1 with respect to a phase number n, thereby being capable of restoring a waveform equivalent to a differential waveform sampled in 1/n steps, and as in the above first aspect, being capable of determining whether the shape of the light emission waveform is normal, or not. In addition, values that affect errors such as a duty cycle or a rising time can be detected.

BRIEF DESCRIPTION OF DRAWINGS

FIG. 3 is a diagram illustrating a sequence of eight phases.

FIG. 6 is a diagram illustrating a sequence of 12 phases according to the first embodiment.

FIG. 7 is a diagram illustrating a sequence of 16 phases according to the first embodiment.

DESCRIPTION OF EMBODIMENTS

Figure 26:
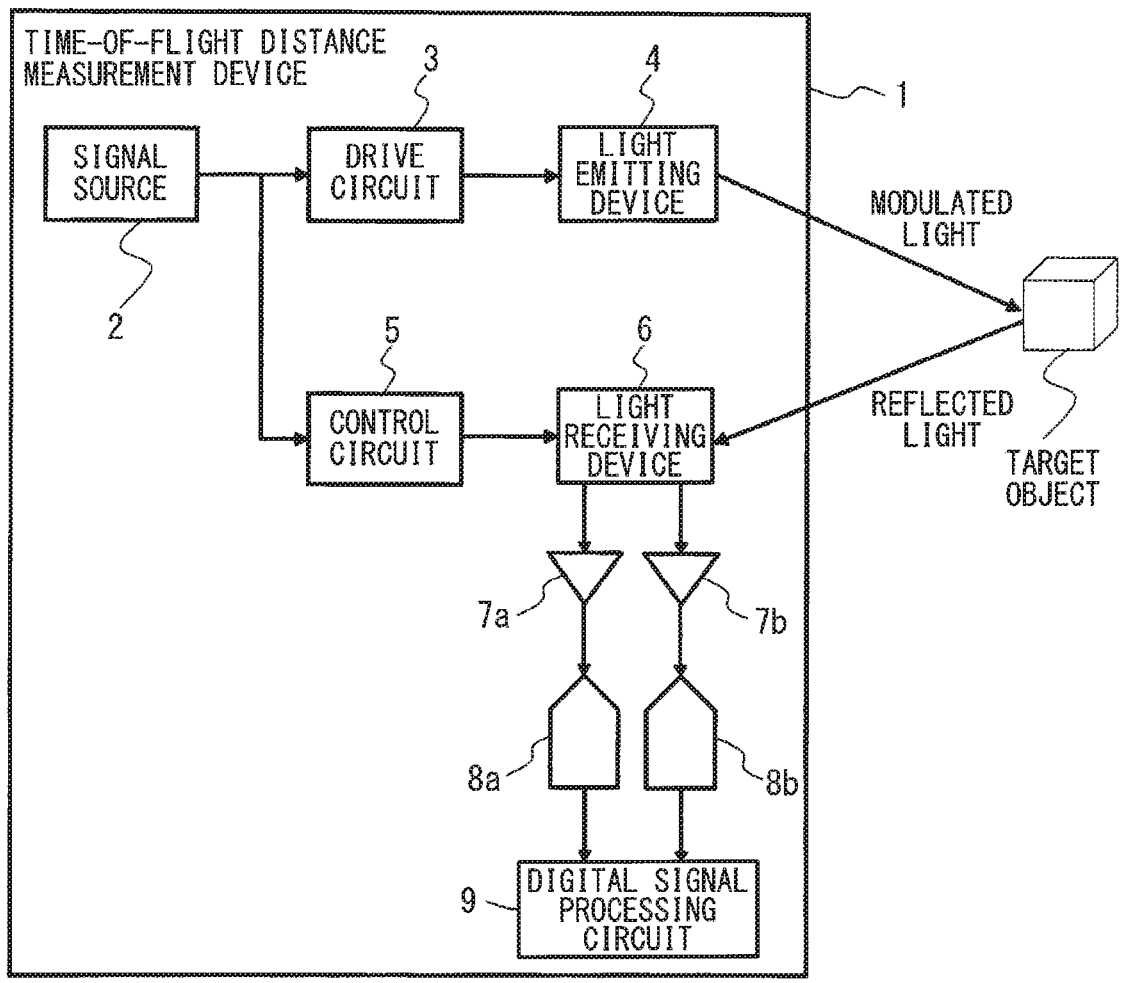
FIG. 26 is a functional block diagram illustrating a configuration of a time-of-flight distance measurement device as a reference example.

First, FIG. 26 illustrates a basic configuration of a time-of-flight distance measurement device as a reference example. A time-of-flight distance measurement device 1 includes a signal source 2, a drive circuit 3, a light emitting device 4, a control circuit 5, a light receiving device 6, buffers 7a and 7b, AD conversion circuits 8a and 8b, and a digital signal processing circuit 9. The light emitting device 4 is an LD (laser diode) or an LED (light emitting diode) which emits, for example, an infrared ray as a modulated light. The light receiving device 6 is an image sensor using a process of, for example, a CMOS (complementary metal oxide semiconductor) or a CCD (charge coupled device).

In the time-of-flight distance measurement device 1, since there is a need to control an exposure of the light receiving device 6 in synchronization with a modulated light emitted from the light emitting device 4, the drive circuit 3 and the control circuit 5 are controlled by the same signal source 2. The signal source 2 outputs a signal for establishing synchronization between the light emitting device 4 and the light receiving device 6. The signal output from the signal source 2 may be a rectangular pulse (normally several to several tens MHz) for driving the light emitting device 4, or may be only a synchronization pulse.

Figure 27:
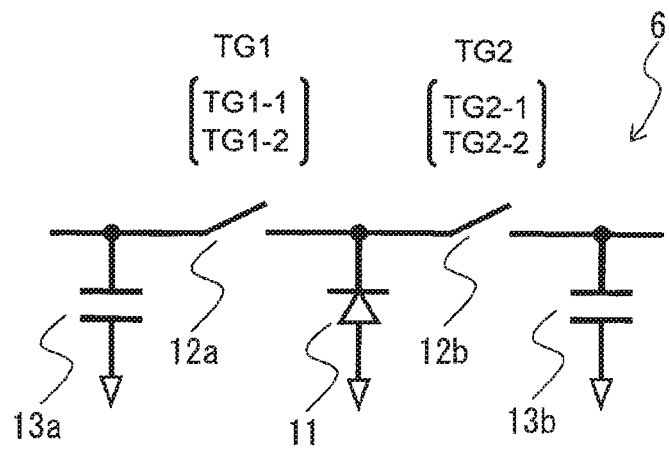
FIG. 27 is a diagram illustrating a configuration of a light receiving device (two-capacitor configuration).

As illustrated in FIG. 27, the light receiving device 6 includes a PD (photodiode) 11, two modulation switches 12a, 12b, and two storage capacitors 13a, 13b. The two modulation switches 12a and 12b include, for example, MOS devices such as MOS transistors and transfer gates, devices having a CCD structure, and so on. The two storage capacitors 13a and 13b include, for example, capacitive elements such as a MOS, a CCD, and an MIM (metal insulator metal), wirings, parasitic capacitors of a PN junction, and so on.

The light receiving device 6 drives the modulation switches 12a and 12b according to control signals TG1 and TG2 and distributes photoelectrons generated by the received incident light to the storage capacitors 13a and 13b. Since the control signals TG1 and TG2 are signals synchronized with the modulated light, the charge amount of the photoelectron distributed to the storage capacitors 13a and 13b is changed according to a distance from the subject device to the target object. The digital signal processing circuit 9 calculates the charge amount of photoelectrons distributed to the storage capacitors 13a and 13b, and calculates a distance from the subject device to the target object (performs a ranging). In FIG. 27, the two storage capacitors 13a and 13b are illustrated, but three or more storage capacitors may be provided.

Figure 28:
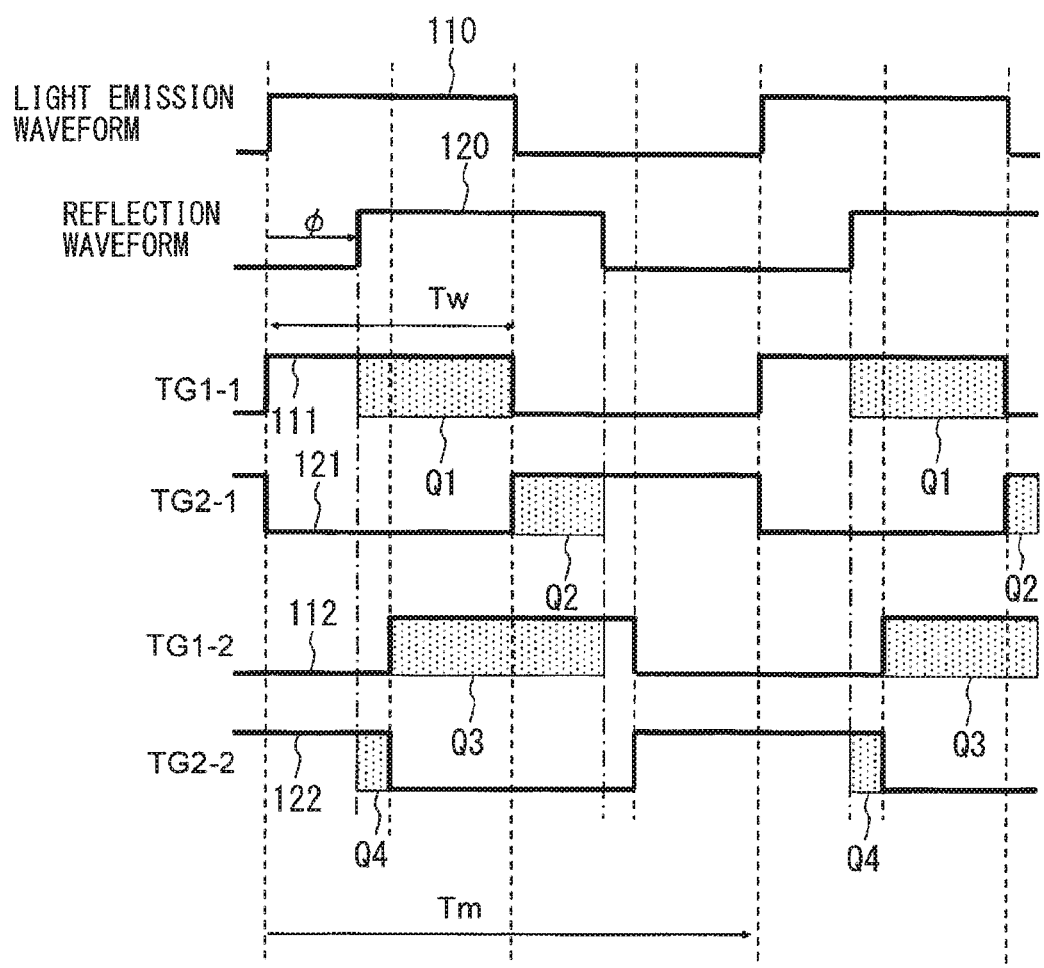
FIG. 28 is a diagram illustrating a sequence of four phases.

FIG. 28 illustrates a sequence when the light receiving device 6 is driven at four different timings. The waveform (light emission waveform 110) of the modulated light emitted from the light emitting device 4 is modified with a rectangular wave synchronized with the control signals TG1 and TG2. FIG. 28 illustrates a case in which the light is modulated with the rectangular wave, but the light may be modulated with a waveform of a sine wave, a triangle wave, a pseudo-random sequence, or the like. Since the waveform (reflection waveform 120) of the reflected light obtained by reflecting the modulated light on the target object has a time difference to the light emission waveform 110, the waveform is delayed from the light emission waveform 110 by a phase difference φ. On the other hand, the control signals TG1 and TG2 are driven by rectangular waves different in phase from each other by 90 degrees. The digital signal processing circuit 9 acquires information (voltage value subjected to charge-to-voltage conversion) on the generated light charges Q1 and Q2 after the sequences driven by control signals TG1-1 and TG2-1 (drive waveforms 111, 121) has been repeated in cycles of about several thousands to hundreds of thousands times. Thereafter, the digital signal processing circuit 9 acquires information on the generated light charges Q3 and Q4 after the sequence driven by the control signals TG1-2 and TG2-2 (drive waveforms 112, 122) has been repeated in the cycles of several thousands to hundreds of thousands times, similarly. The digital signal processing circuit 9 calculates the phase difference θ from the acquired Q1 to Q4 with the use of a discrete Fourier transform (DFT) through the following arithmetic expression (1).

$$\theta=\tan^{-1}[(Q1-Q3)/(Q2-Q4)] \quad (1)$$

The arithmetic expression (1) is used to calculate a phase difference based on the above four samplings. Similarly, in a general N-phase, the phase difference can be calculated through the following arithmetic expression (2).

$$\theta=\tan^{-1}[(\Sigma Qk^*\sin(2\pi/N^*k))/(\Sigma Qk^*\cos(2\pi/N^*k))] \quad (2)$$

In this example, if the reflection waveform 120 is an ideal sine wave, θ is equal to φ, but when the reflection waveform 120 includes a harmonic component, θ has an error with respect to φ (for example, in the case of an ideal rectangular wave, that is, four phases, an error of ±4 degrees). On the other hand, it is preferable to modulate the light with a rectangular wave rather than the sine wave from the viewpoint of ease of implementation of the drive circuit 3 and modulation contrast. For that reason, as the above-mentioned error, a method of correcting the above error on the basis of an error between the ideal rectangular wave and the sine wave, data actually measured or the like is disclosed as the conventional art.

Figure 29:
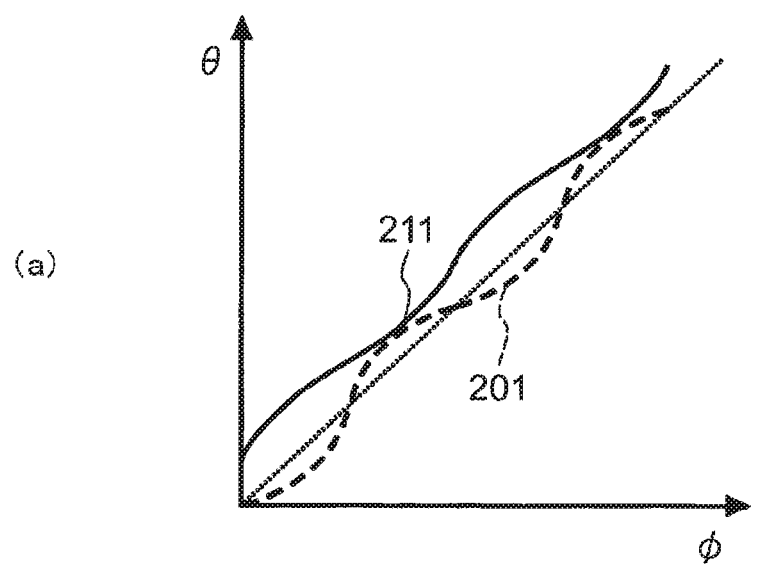
FIGS. 29A and 29B are diagrams illustrating a divergence between an ideal waveform and an actual waveform.
Figure 29:
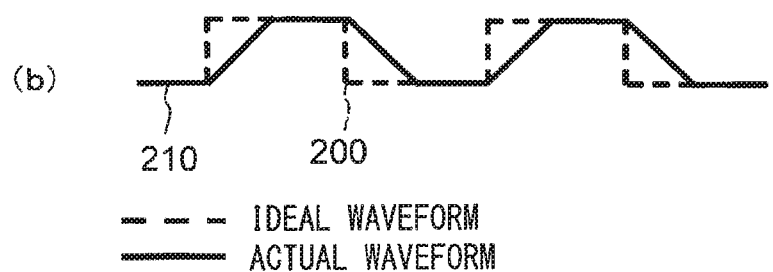

The method of correcting the above error on the basis of the error between the ideal rectangular wave and the sine wave will be described. FIG. 29A illustrates a relationship between θ and φ in this case as a phase error 201. This relationship can be obtained analytically, for example, it is known to have an error of about ±4 degrees with respect to the ideal rectangular wave. If the light emission waveform 110 is close to a rectangular wave, a sufficient correction can be obtained by this method, but when the reflection waveform 120 has an error with respect to the ideal rectangular wave, there is a possibility that the sufficient correction cannot be performed. FIG. 29B illustrates a case in which an actual waveform 210 has a finite rise and fall with respect to an ideal waveform 200. In this case, the relationship between θ and φ has a value different from the ideal waveform 200 as indicated by reference numeral 211, and cannot correct the error (or expands the error). This example shows a case in which the rising and falling times are non-ideal, but in addition to such a case, a time constant of the circuit and a duty cycle of the waveform similarly contribute to the error.

As described above, in the time-of-flight distance measurement device 1, there is a possibility that an error occurs in the distance calculation result depending on the shape of the light emission waveform. There are mainly three main methods for coping with the error as follows. A first method is to increase the number of storage capacitors and sample the waveform finely. A second method is to calculate the error to be generated due to some means and correct the error by a circuit at a subsequent stage. A third method is to reduce the sensitivity to a calculated value due to a difference in the waveform. Hereinafter; three methods will be described below.

Figure 30:
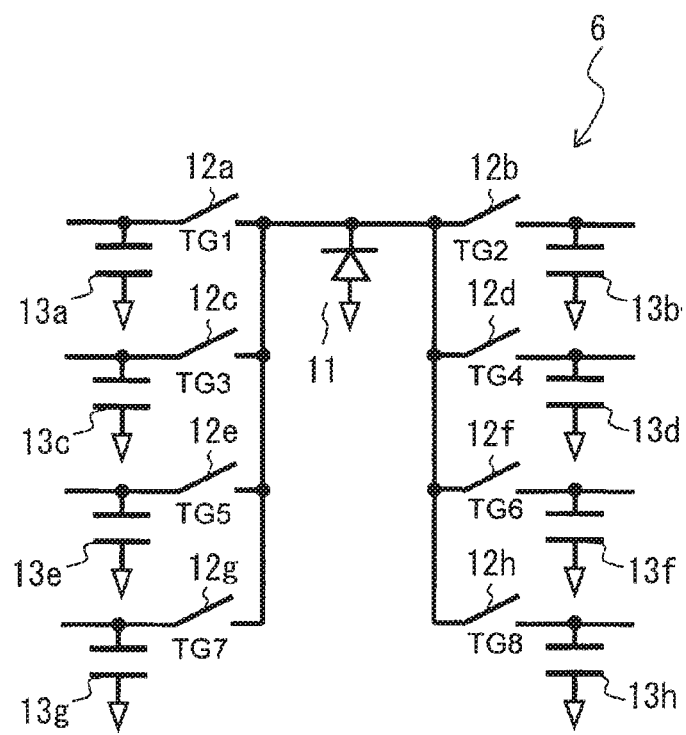
FIG. 30 is a diagram illustrating a configuration of a light receiving device (eight-capacitor configuration).
Figure 31:
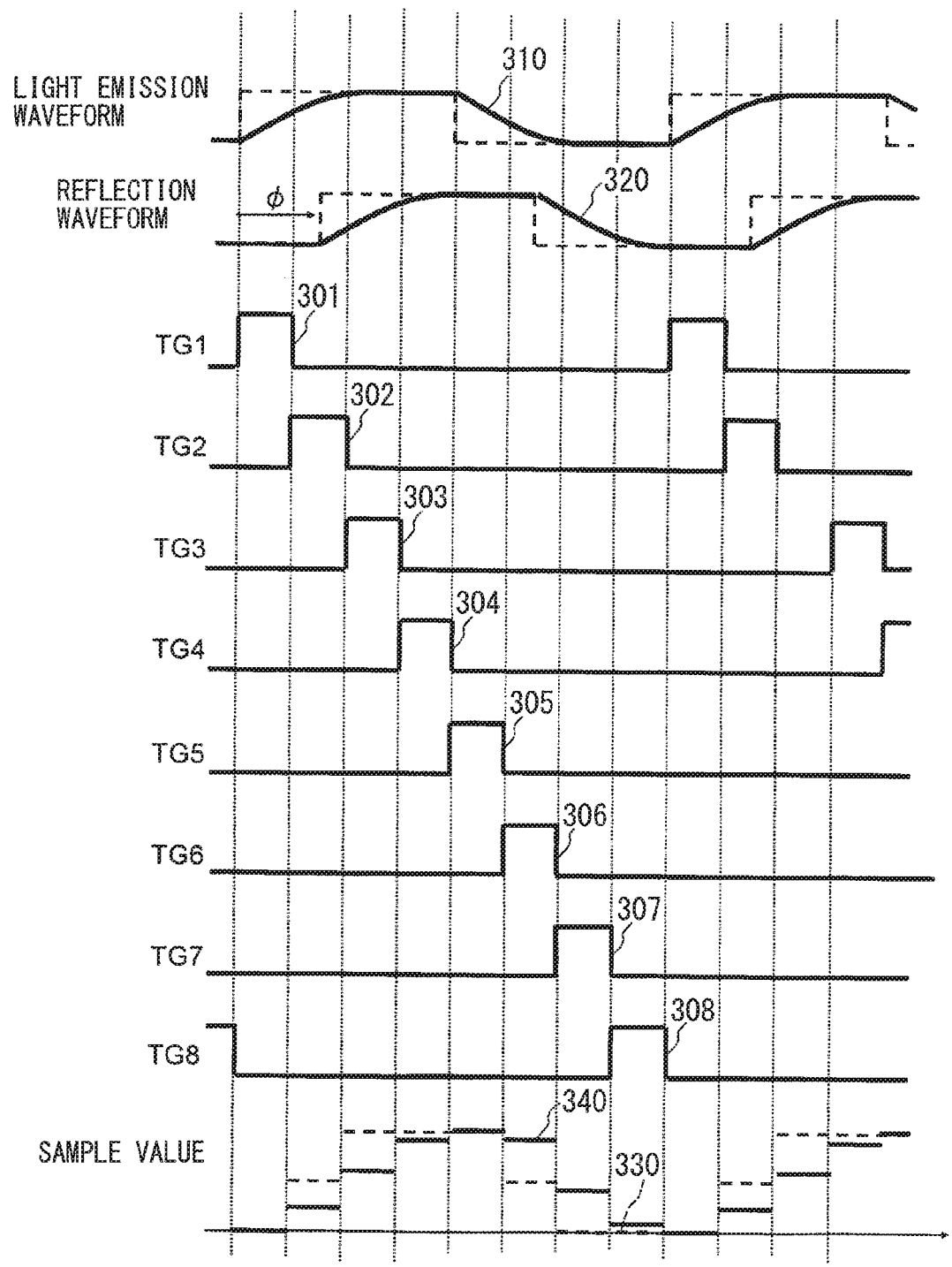
FIG. 31 is a diagram illustrating a sequence to be realized for monitoring a waveform.

First, the first method will be described. Referring to FIG. 30, the light receiving device 6 includes the PD 11, eight modulation switches 12a to 12h, and eight storage capacitors 13a to 13h. In the configuration, a sequence is illustrated in FIG. 31. The modulation switches 12a to 12h are driven according to control signals TG1 (drive waveform 301) to TG8 (drive waveform 308), thereby being capable of enhancing a time resolution of sampling. For example, when a light emission waveform 310 has a difference caused by a response delay as indicated by a solid line with respect to an ideal rectangular wave indicated by a broken line, a reflection waveform 320 also has a difference caused by a similar response delay. In the difference, in a configuration illustrated in FIG. 30, since the number of storage capacitors 13a to 13h is larger than that illustrated in FIG. 27, more detailed information can be acquired on a time axis as illustrated in the sample value. For that reason, a sample value 340 having the response delay with respect to a sample value 330 of the ideal rectangular wave can be acquired. Since the operation of the light emission waveform 310 and the operation of the control signals TG1 to TG8 are synchronized with each other, the sampling operation described above is not contradictory to the operation of repeating the cycle of about several thousands to several hundred thousand times described above.

However, in order to leverage that technique, there is a need to dispose the number of storage capacitors according to the time resolution. Since a magnitude of the storage capacity is proportional to the storable charge, the more the storage capacitors are disposed in the same area, the smaller the charge amount that can be accumulated per storage capacity decreases. As a result, the signal path is likely to be saturated. For that reason, a control has to be performed so as to shorten an exposure time, and a random noise is not sufficiently averaged, resulting in a risk of a reduction in an SNR (Signal to Noise Ratio). Furthermore, in a configuration in which, for example, eight storage capacitors 13a to 13h are disposed, an integration period of each control signal TG becomes a small value such as ⅛ of a modulation period Tm. Therefore, a high-speed response is required for the control circuit 5, the light receiving device 6, and a signal path connecting those elements.

Next, the second method will be described. A technique for actually measuring a distance to a target object placed at a known distance and correcting the distance based on measurement data (Patent Literature 2) will be described. In the technique, the distance measurement to the target object (target) placed at a certain distance is actually performed, and the distance or a phase shift of the signal driving a gate is swept so as to write a correction value in a LUT. Since such a technique requires a target object whose distance and size are controlled, the technique is inapplicable in an environment where the user actually uses the technique. In other words, the technique is applicable only to an adjustment before shipping or a case in which the user complains about a failure or the like. Therefore, there is a risk that the technique cannot cope with a case in which the light emission waveform changes due to a change in usage environment such as temperature, deterioration over time, or the like.

Next, the third method will be described. A technique (disclosed in Patent Literature 4) improved on the above technique will be described. This technique is to reduce sensitivity to the error in question by switching an acquisition number N to another. Further, since the acquisition number N can be switched to another, the amount of error can be detected. According to that technique, the error caused by the difference in the reflection waveform can be reduced with respect to the measured value of the distance by setting the acquisition number N to a small sensitivity (specifically, odd number) with respect to high-order harmonics. However, in that case, since the sensitivity caused by the high-order harmonics of the reflection waveform is reduced, the change in the reflection waveform cannot be monitored. For example, the duty cycle of the waveform has a high correlation with an even harmonic (specifically, a second order), and a distortion of the waveform has a high correlation with an odd harmonic (specifically, third and fifth orders). However, in the case of N=5 or N=7, the calculation result is not sensitive to those harmonics. For that reason, in order to monitor the waveform with that technique, there is a need to switch the acquisition number N and perform the distance measurement multiple times. For example, when trying to obtain two pieces of information on the duty cycle of the waveform and the distortion of the waveform, three measurements in total including N=3 sensitive to the duty cycle (correlated with the second-order harmonic), N=4 sensitive to the waveform distortion (correlated with the odd harmonic), and N (for example, N=5) which are not sensitive to both of the duty cycle and the waveform distortion are required. For that reason, the measurement time required for monitoring is prolonged. Also, each of the distance measurement results at N=3 and N=4 has an error caused by an influence of high-order harmonics. Although those distance measurement results can be corrected from the differences from the non-sensitive N, there is a need to switch a correction table according to N, which may lead to an increase in a circuit scale.

In view of the above, the time-of-flight distance measurement device capable of monitoring the shape of the light emission waveform without interrupting the distance measurement will be described below with reference to multiple embodiments.

First Embodiment

In the first embodiment, time-of-flight distance measurement device, for example, a time-of-flight distance measurement device mountable on a vehicle is employed, and will be described below with reference to FIGS. 1 to 7. In that case, a target object to which a distance from a subject device is calculated is, for example, a person, a vehicle, a wall, or the like. A time-of-flight distance measurement device 21 includes a signal source 22, a drive circuit 23, a light emitting device 24, a control circuit 25 (control unit), a light receiving device 26, buffers 27a and 27b, AD conversion circuits 28a and 28b and a digital signal processing circuit 29 (signal processing unit). The time-of-flight distance measurement device 21 has the same configuration as that of the time-of-flight distance measurement device 1 described above.

Figure 1:
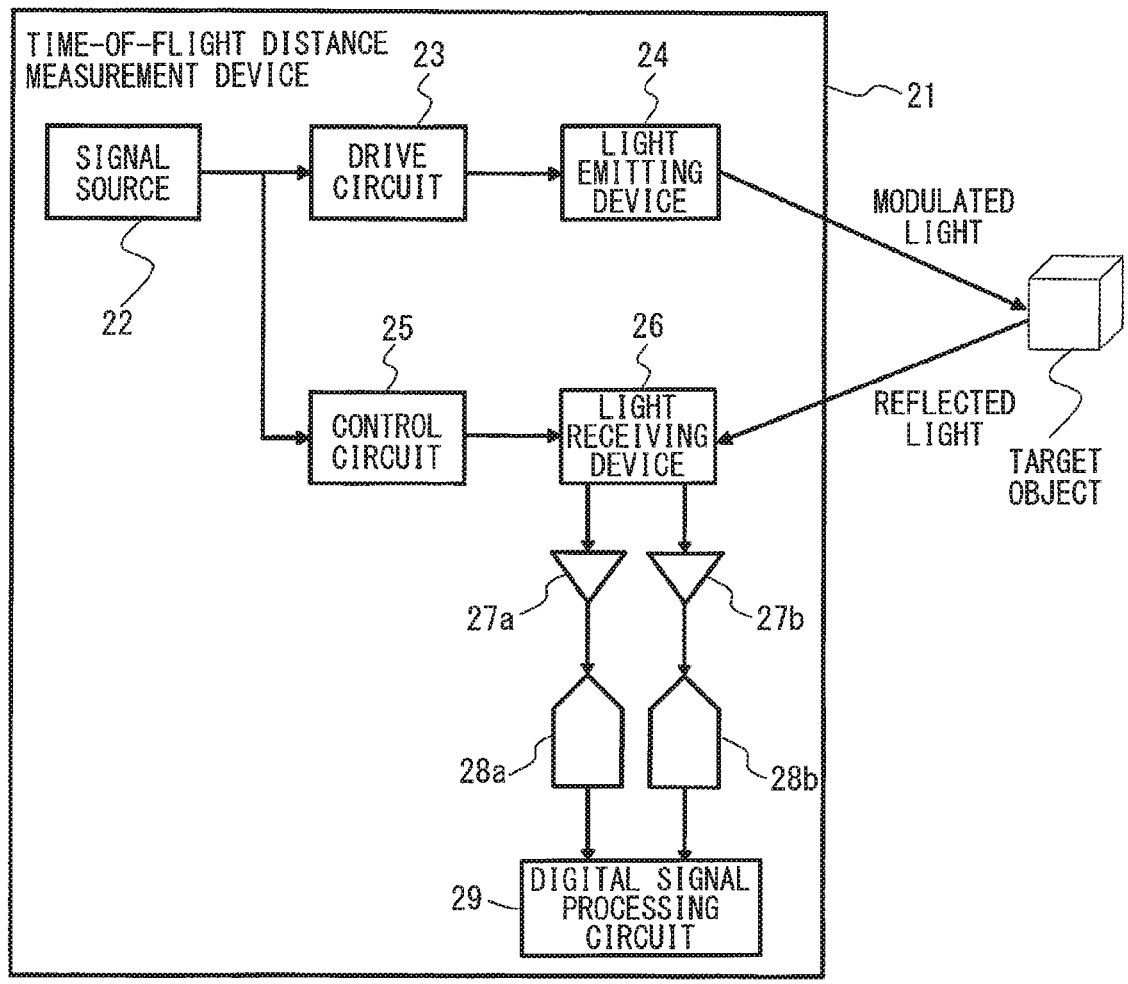
FIG. 1 is a functional block diagram illustrating a first embodiment.
Figure 2:
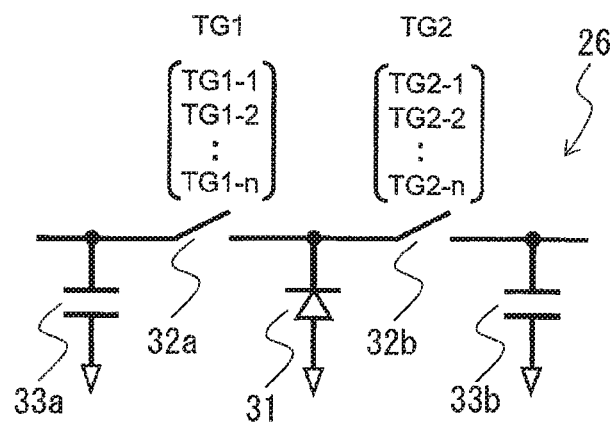
FIG. 2 is a diagram illustrating a configuration of a light receiving device (two-capacitor configuration).

As illustrated in FIG. 2, the light receiving device 26 includes a PD 31, two modulation switches 32a, 32b, and two storage capacitors 33a, 33b. The light receiving device 26 drives the modulation switches 32a and 32b according to control signals TG1 and TG2 and distributes photoelectrons generated by the received incident light to the storage capacitors 33a and 33b. In the light receiving device 26, a sequence of control signals TG1-x and TG2-x increases with respect to the light receiving device 6 described above, and a basic configuration is the same as that of the above light receiving device 6 excluding the above configuration.

Figure 3:
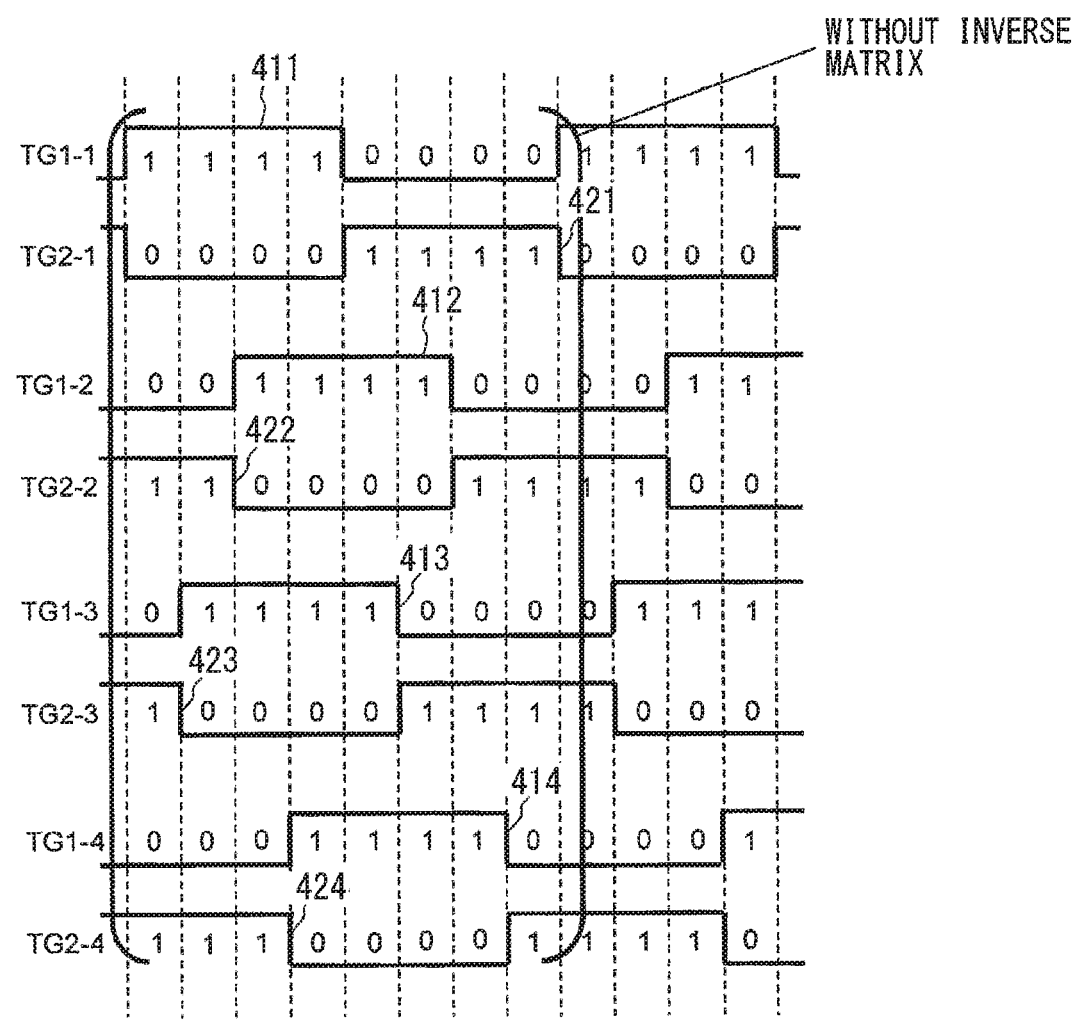

When modulation switches 32a and 32b are driven with the use of four or more phases, the light receiving device 26 is driven in a sequence shown in FIG. 3. The digital signal processing circuit 29 acquires information on the generated light charges after the sequence driven by the control signals TG1-1 to 4 (drive waveforms 411 to 414) and the control signals TG2-1 to 4 (drive waveforms 421, 424) has been repeated in the cycles of several thousands to hundreds of thousands times. The digital signal processing circuit 9 calculates the phase difference θ with the use of a discrete Fourier transform (DFT) through the above arithmetic expression (2).

Figure 4:
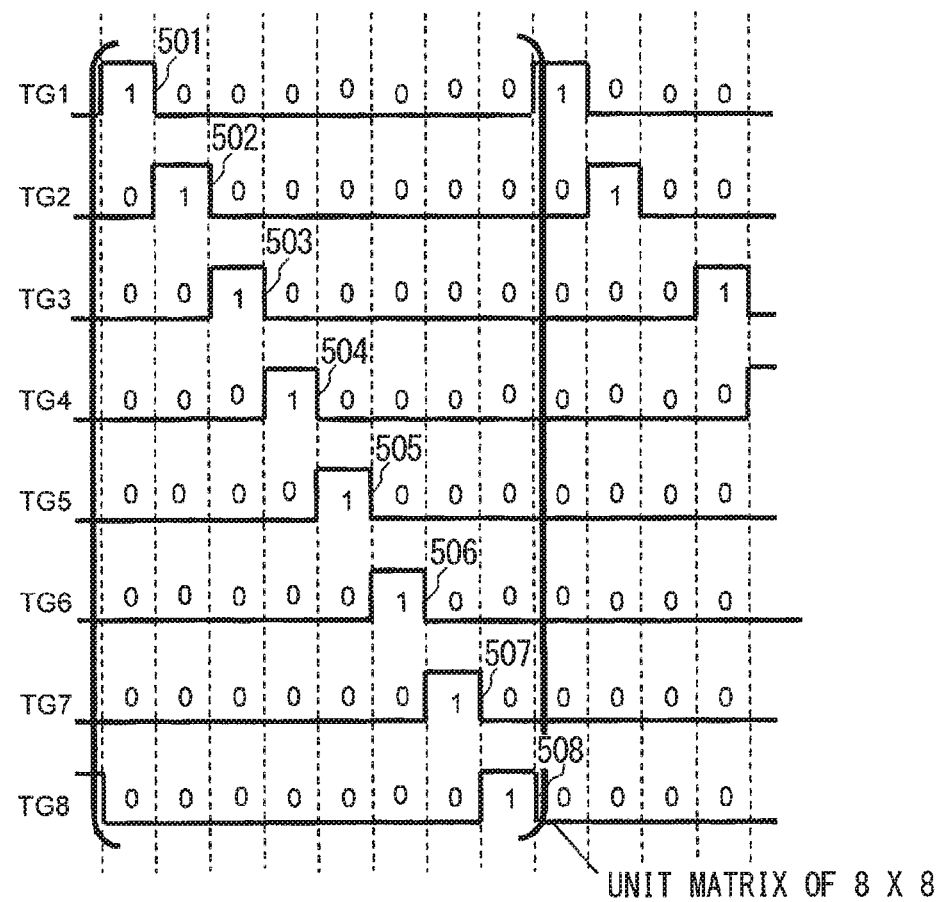
FIG. 4 is a diagram illustrating a matrix representation of an equivalent sequence.

The digital signal processing circuit 29 assigns "1" when TGx-x is "H (ON)" for each delimiter (unit period) of ⅛ times of the modulation period Tm of each sequence, assigns "0" when TGx-x is "L (OFF)", and treats the sequence as an 8×8 unit matrix. FIG. 4 is a diagram rewritten by applying the same concept to a sequence of FIG. 31 described above. Since the sequence shown in FIG. 4 represents an 8×8 unit matrix, a rank (class) is 8 (generally n with respect to the phase number n). On the other hand, a rank of the 8×8 unit matrix shown in FIG. 3 is 5 (generally (n/2)+1 with respect to the phase number n). Therefore, no matter how the sampling values obtained in the sequence of FIG. 3 are linearly computed, a result equivalent to the sequence of FIG. 4 cannot be obtained.

Figure 5:
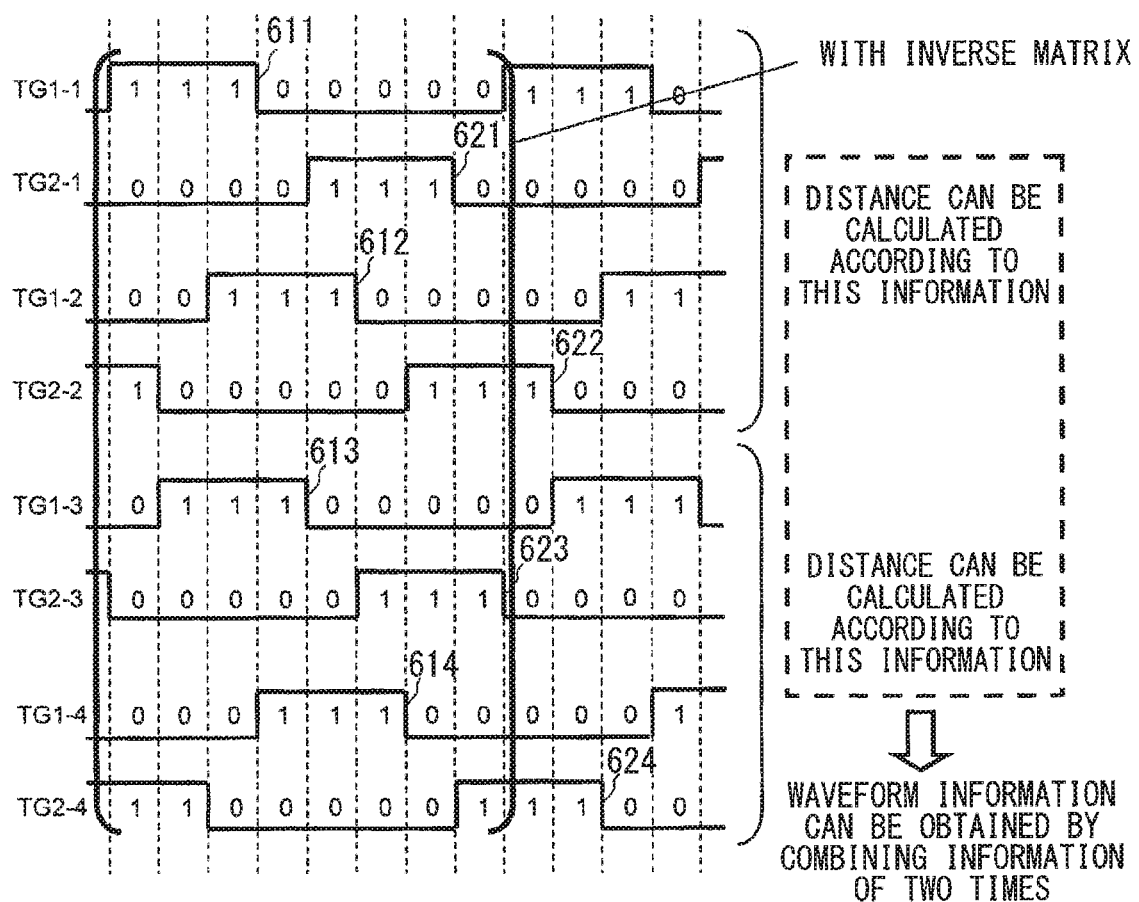
FIG. 5 is a diagram illustrating a sequence of eight phases according to a first embodiment.
Figure 8:
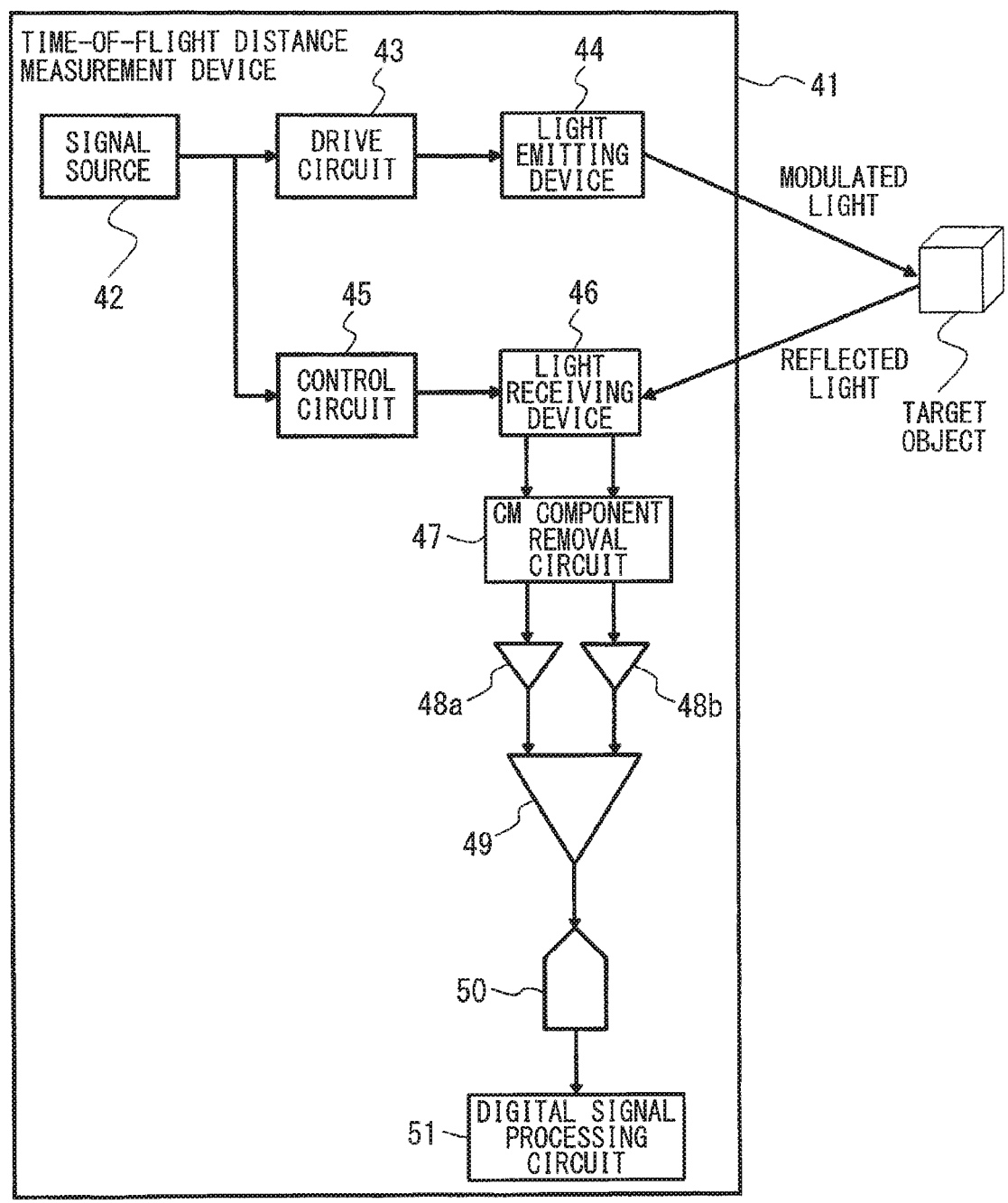
FIG. 8 is a functional block diagram illustrating a second embodiment.

On the contrary, in the present embodiment, as illustrated in FIG. 5, the control circuit 5 drives the light receiving device 6 with a sequence of drive waveforms 611 to 614 and 621 to 624. As a result, a result equivalent to the sequence of FIG. 4 can be obtained by linearly computing the sampling values obtained in the sequence of FIG. 5. That is, a waveform equivalent to the waveform sampled in a 1/n step can be restored. In addition, advantageously, the same calculation as that of the distance measurement for four phases described above can be implemented for every four of those samplings, and the calculated value of the distance can be acquired for each group.

That is, in the above-described reference example, the duty cycle of TGx-x is set to 50% and the half cycle of the modulation period Tm is set to "H" and "L". However, in the present embodiment, the duty cycle of TGx-x is changed from 50%. Although there are infinitely many ways to make such a n rank matrix, as illustrated in FIG. 5, a period of [(n/2)−1] (a period of 3 if n is 8) is set to "H" and a period of [(½) n+1] (a period of 5 if n is 8) is set to "L" for the modulation period Tm, thereby being capable of realizing a sequence satisfying a condition of the n rank matrix.

With the application of the sequence of FIG. 5, a time for integrating a signal component decreases. However, the decrease of the time can be relaxed more as the phase number is increased more. Further, as will be described later, the above influence can be alleviated by switching between the sequence of the present embodiment and the sequence of the reference example. This is because the components of the light receiving device itself are basically not changed from the reference example.

Figure 6:
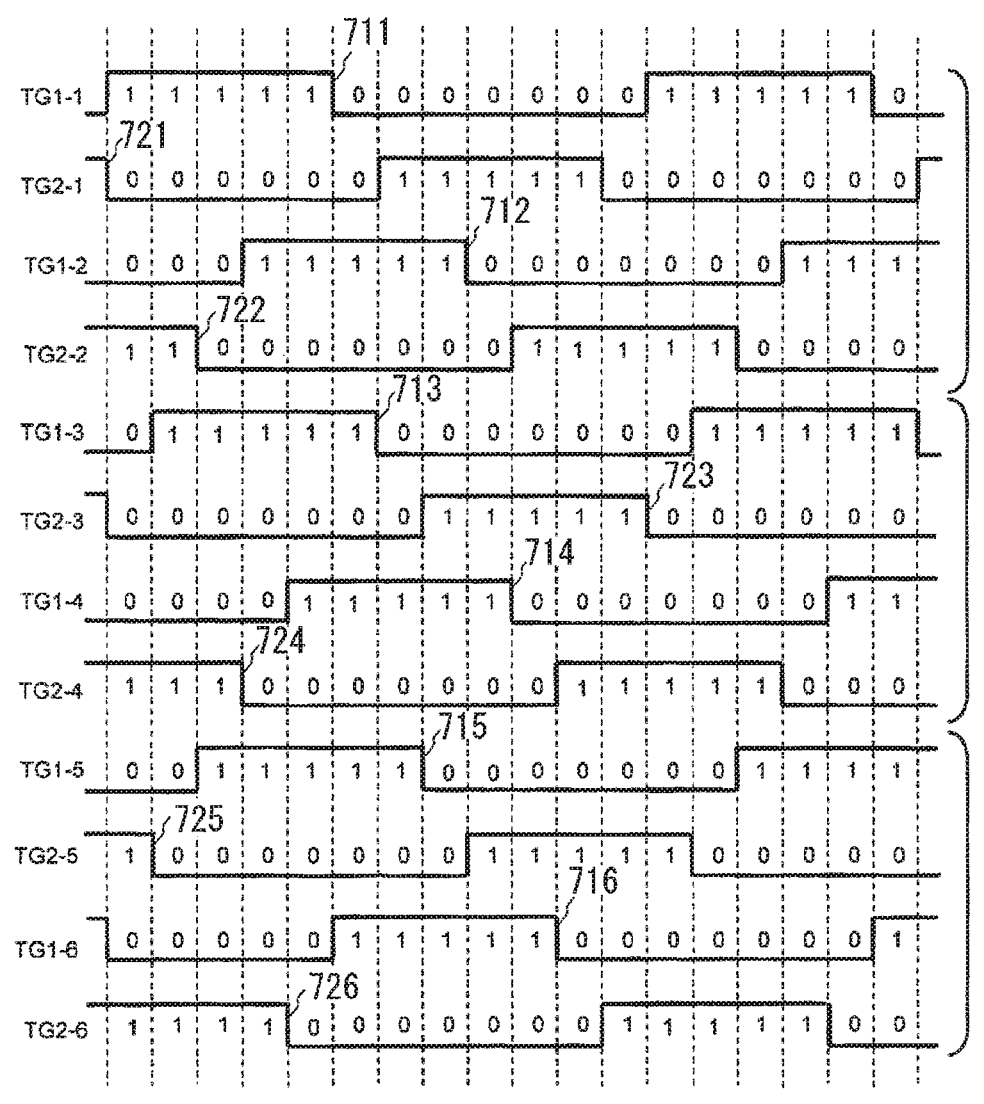

Although FIG. 5 exemplifies a case of eight phases, the number of phases can be extended to eight or more. In the case of 12 phases, as illustrated in FIG. 6, the light receiving device is driven by a sequence of drive waveforms 711 to 716 and 721 to 726. In the case of 16 phases, as illustrated in FIG. 7, the light receiving device is driven in a sequence of the drive waveforms 811 to 818 and 821 to 828. Furthermore, the present disclosure can also be applied to phases more than those phases and phases between those phases.

As described above, the first embodiment can obtain advantages described below. In the time-of-flight distance measurement device 21, the light receiving device 26 is driven by a sequence having the matrix of the phase number n, a value sampled on the basis of the n rank matrix with respect to the phase number n is linearly calculated, and a waveform equivalent to the waveform sampled in the 1/n step is detected. As a result, a linear operation is performed on a sampled value based on a matrix with a rank n with respect to a phase number n, thereby being capable of restoring a waveform equivalent to a waveform sampled in 1/n steps, and determining whether the shape of the light emission waveform is normal, or not. In addition, values that affect errors such as a duty cycle or a rising time can be detected. With the use of the determination result, the calculation result of the distance from the subject device to the target object can be corrected, or an alarm can be output to notify the user of the possibility of a malfunction.

Second Embodiment

Next, a second embodiment of the present disclosure will be described with reference to FIGS. 8 to 19. Although the first embodiment has a single end configuration, a second embodiment is of a differential output configuration. A time-of-flight distance measurement device 41 includes a signal source 42, a drive circuit 43, a light emitting device 44, a control circuit 45 (control unit), a light receiving device 46, a CM (common mode) component removal circuit 47 (common mode removal unit), buffers 48a, 48b, a differential detection circuit 49, an AD conversion circuit 50, and a digital signal processing circuit 51 (signal processing unit). A light receiving device 46 has the same configuration as that of the light receiving device 26 described in the first embodiment. That is, the light receiving device 46 has a PD 31, two modulation switches 32a, 32b, and two storage capacitors 33a, 33b. The modulation switches 32a and 32b are driven by control signals TG1 and TG2 and photoelectrons generated by the received incident light are distributed to the storage capacitors 33a and 33b.

When a background light of a level that cannot be ignored as compared with the emitted modulated light is present, the CM component removal circuit 47 avoids the saturation with the use of the configuration of such pixels. As a method for removing the CM component, various techniques are disclosed. For example, the techniques are disclosed in U.S. Pat. No. 6,919,549B2, German Patent Publication No. 102005056774A1, European Patent Publication No. 1622200A1, and so on. The first embodiment and the second embodiment are identical with each other in that the structure that retains only the difference and performs the operation of reducing an in-phase component is mounted inside of the light receiving device. A differential detection circuit 49 detects a difference between signals input from the buffers 48a and 48b, and outputs a signal corresponding to the detected difference to an AD conversion circuit 50. The AD conversion circuit 50 converts a signal input from the differential detection circuit 49 from an analog signal into a digital signal, and outputs the digital signal to a digital signal processing circuit 51. The buffers 48a and 48b are frequently realized by, for example, a source follower circuit from the viewpoint of simplification. Although a differential amplifier is used as the differential detection circuit 49, the AD conversion circuit 50 may be directly connected to the buffers 48a and 48b.

In such a configuration of the differential output, a component (DC component) of a background light among the incident light received by the light receiving device 46 is removed and outputted. However, in the modulated light emitted from the light emitting device 44, since a DC component does not particularly contribute to the calculation of the distance, even if the modulated light cannot be monitored, contradiction is not raised against the problem to be solved by the present disclosure. In addition, since the background light is removed, the operation of monitoring the waveform of the reflected light, which is the object of the present disclosure, can be performed regardless of the surrounding environment. In other words, the configuration of the differential output is suitable for the application of the present disclosure.

Figure 9:
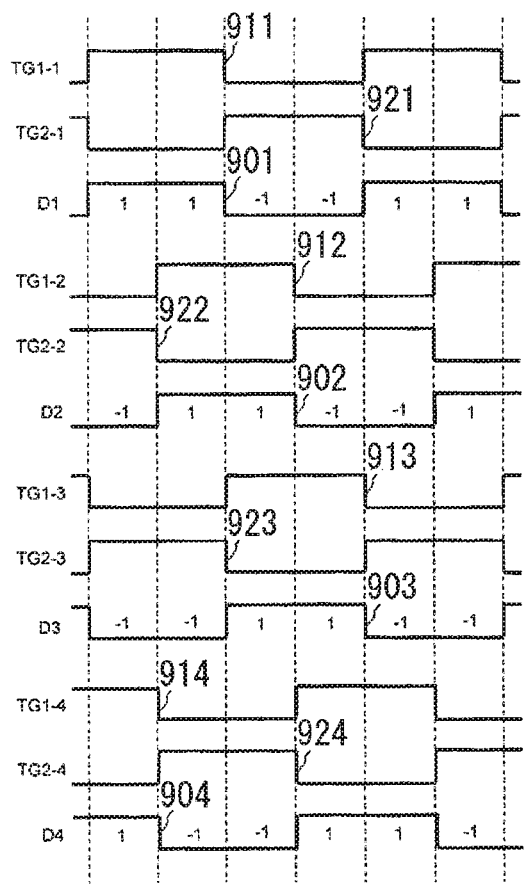
FIG. 9 is a diagram illustrating a sequence of a differential.
Figure 9:
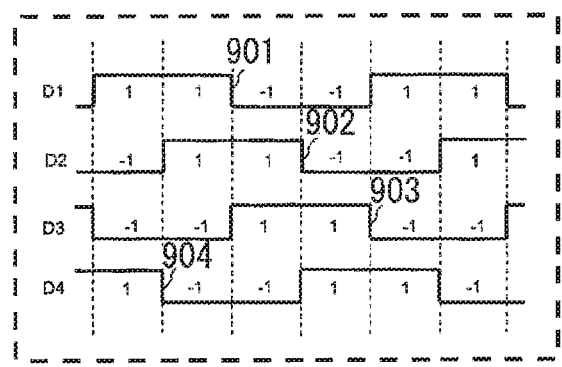

FIG. 9 illustrates a sequence for driving the differential output configuration with four phases. In that case, the combination of control signals TG1 and TG2, for example, the control signals TG1-1 (drive waveform 911) and TG2-1 (drive waveform 912) are repeated by thousands to hundreds of thousands times to acquire one digital value D1 (901). Likewise, digital values D2 (902), D3 (903), and D4 (904) are acquired. In that case, the digital values D1 to D4 are output as values from which the DC component is removed. In each of the digital signals D1 to D4, from the viewpoint of the subsequent matrix analysis, when the TG1 is "H" and the TG2 is "L", "1" is allocated to each digital signal, and when the TG1 is "L" and the TG2 is "H", "−1." is allocated to each digital signal. In other words, the states of the TG1 and TG2 are uniquely determined according to whether the value is "1" or "−1" in the waveform of Dx. Since Dx is a signal indicative of a difference between the two storage capacitors 33a and 33b as described above, the AD conversion circuit 50 outputs a signal that has been subjected to calculation corresponding to a numerator or a denominator of the arithmetic expression (1) described above. For that reason, even if only two sample values such as D1 and D2 are used, the same operation as that of the distance measurement by four phases of a single end configuration can be possible. However, actually, since there is a mismatch between a pair of the modulation switches 32a and 32b and a pair of the storage capacitors 33a and 33b, when only two sample values are used, an error caused by the mismatch occurs. A technique for correcting mismatch by performing the same calculation as that of the above-described arithmetic expression (1) with the use of the digital values D1 to D4 is disclosed in U.S. Pat. No. 7,462,808 B2. The present disclosure can also be applied to such a configuration.

Figure 10:
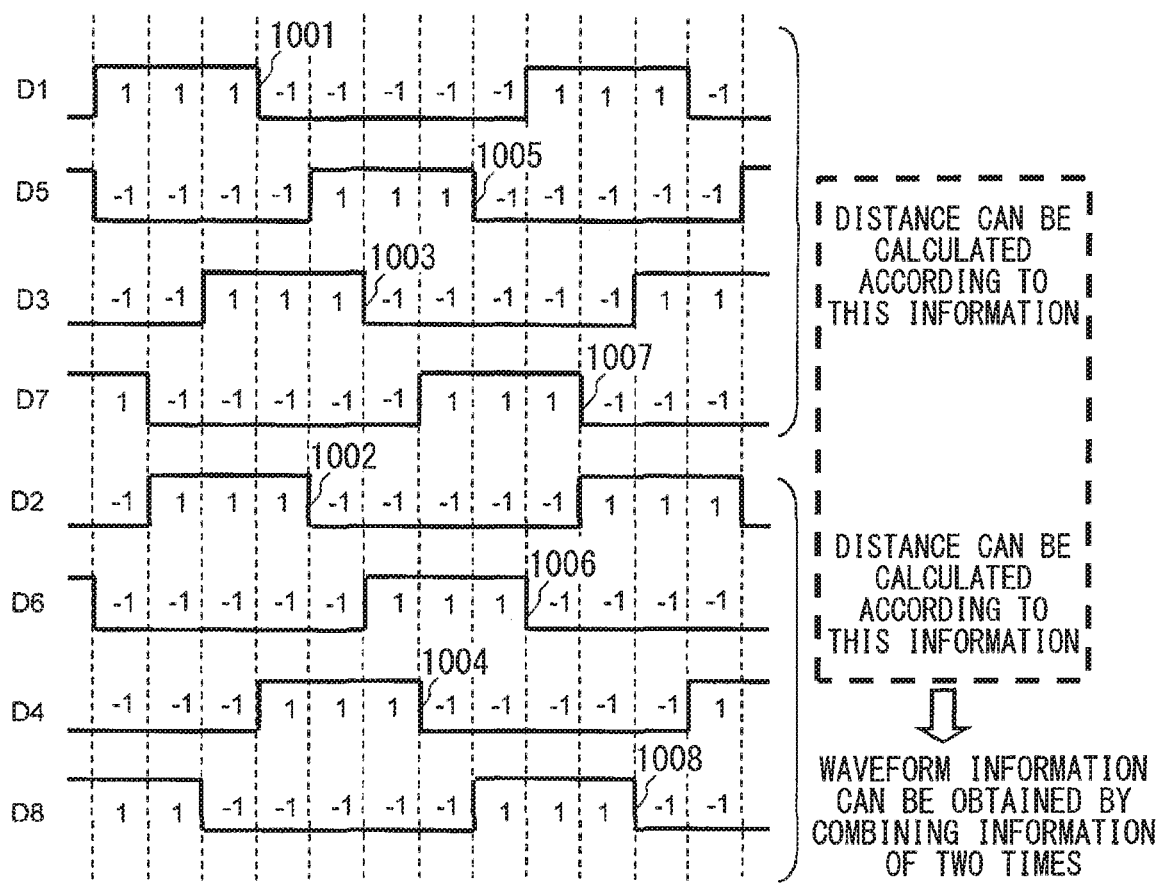
FIG. 10 is a diagram illustrating one sequence of eight phases based on a matrix of a rank n according to the second embodiment.

FIG. 10 illustrates a case in which the phase number n is 8 as in the case of FIG. 5 described in the first embodiment. Similarly, in this case, there are infinite numbers of matrices whose rank is 8, but in this case, a period of $[(n/2)-1]$ is set to "1" with respect to the modulation period Tm and a period of $[(\frac{1}{2}) n+1]$ is set to "−1", thereby being capable of realizing a sequence satisfying the condition of n rank matrix. Also in this case, the distance can be calculated every two samples or every four samples. In particular, when the calculation is implemented for every four samples, the influence of the above-mentioned mismatch can be reduced.

Figure 11:
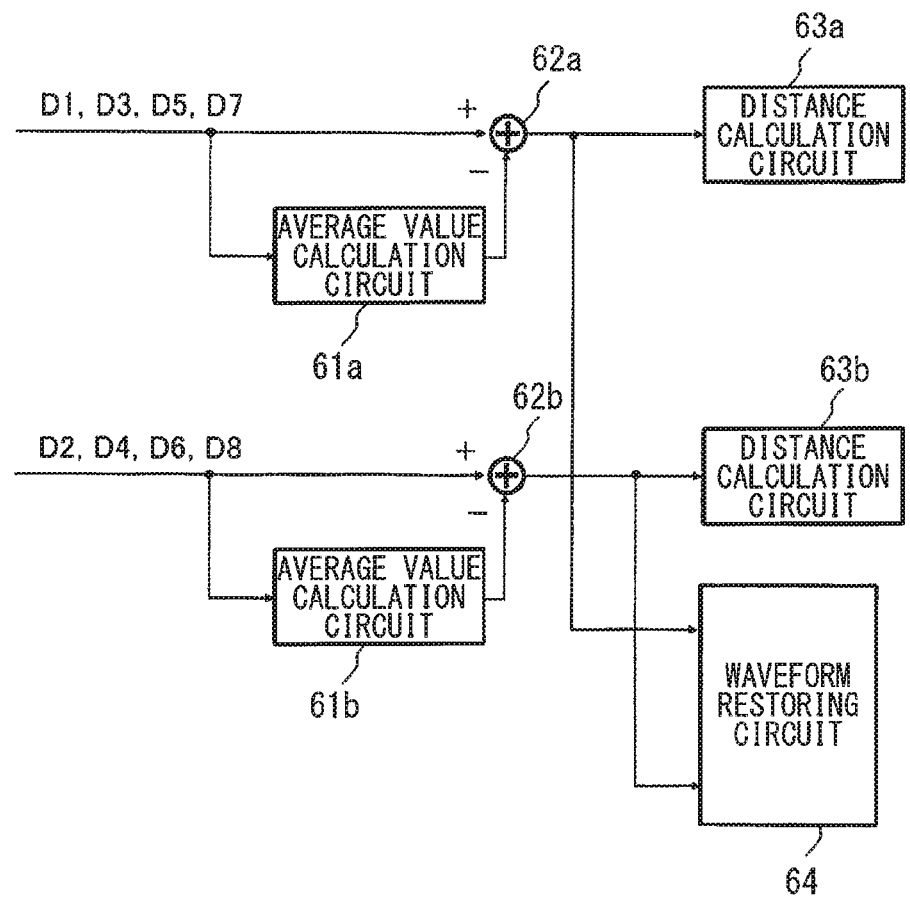
FIG. 11 is a diagram illustrating a configuration for removing an influence of a background light component.

In the sequence of FIG. 10, since the numbers of "+1" and "−1" are not balanced (different) with each other in each sequence, the AD conversion circuit 50 outputs the background light of about ⅛ or the DC component of the signal source 42. In the distance calculation, when the calculation is performed with the use of four samples, the background light of about ⅛ or the DC component of the signal source 42 are canceled by subtraction of two pairs of Dx (for example, D1-D4 in the example of FIG. 10). However, in the case of restoring the output equivalent to the sequence shown in FIG. 4 by the linear operation, the background light and the DC component become errors. FIG. 11 illustrates a configuration example of a circuit for reducing the influence at a subsequent stage of the AD conversion circuit 50. In the configuration of FIG. 11, each of average value calculation circuits 61a and 61b calculates an average value of four sample values (a set of D1, D3, D5, D7, and a set of D2, D4, D6, D8). Each of subtraction circuits 62a and 62b subtracts the average value from each sample value and outputs a subtracted value to a corresponding one of distance calculation circuits 63a and 63b and a waveform restoring circuit 64. In this way, with the subtraction of the average value from each sample value, the error described above can be avoided.

Figure 12:
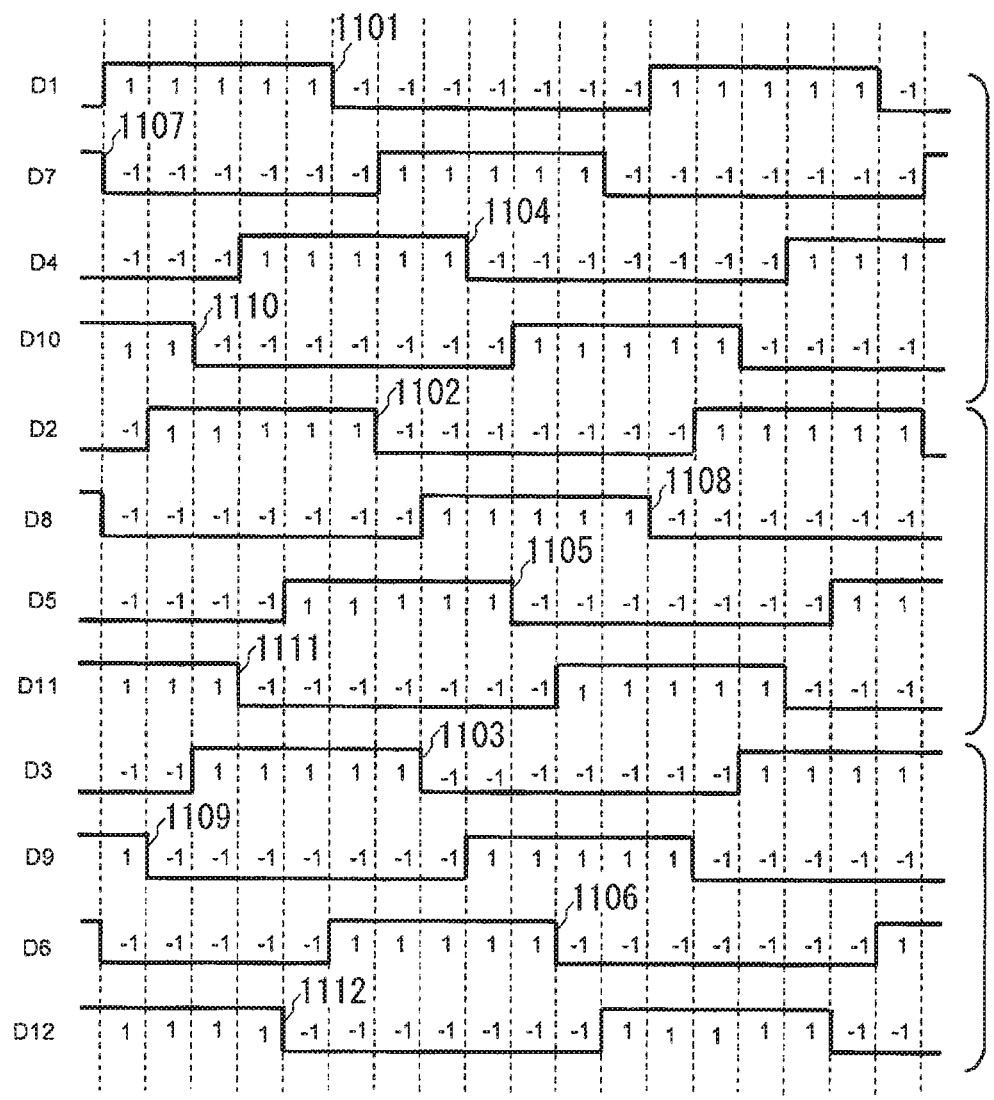
FIG. 12 is a diagram illustrating one sequence of 12 phases based on the n rank matrix according to the second embodiment.
Figure 13:
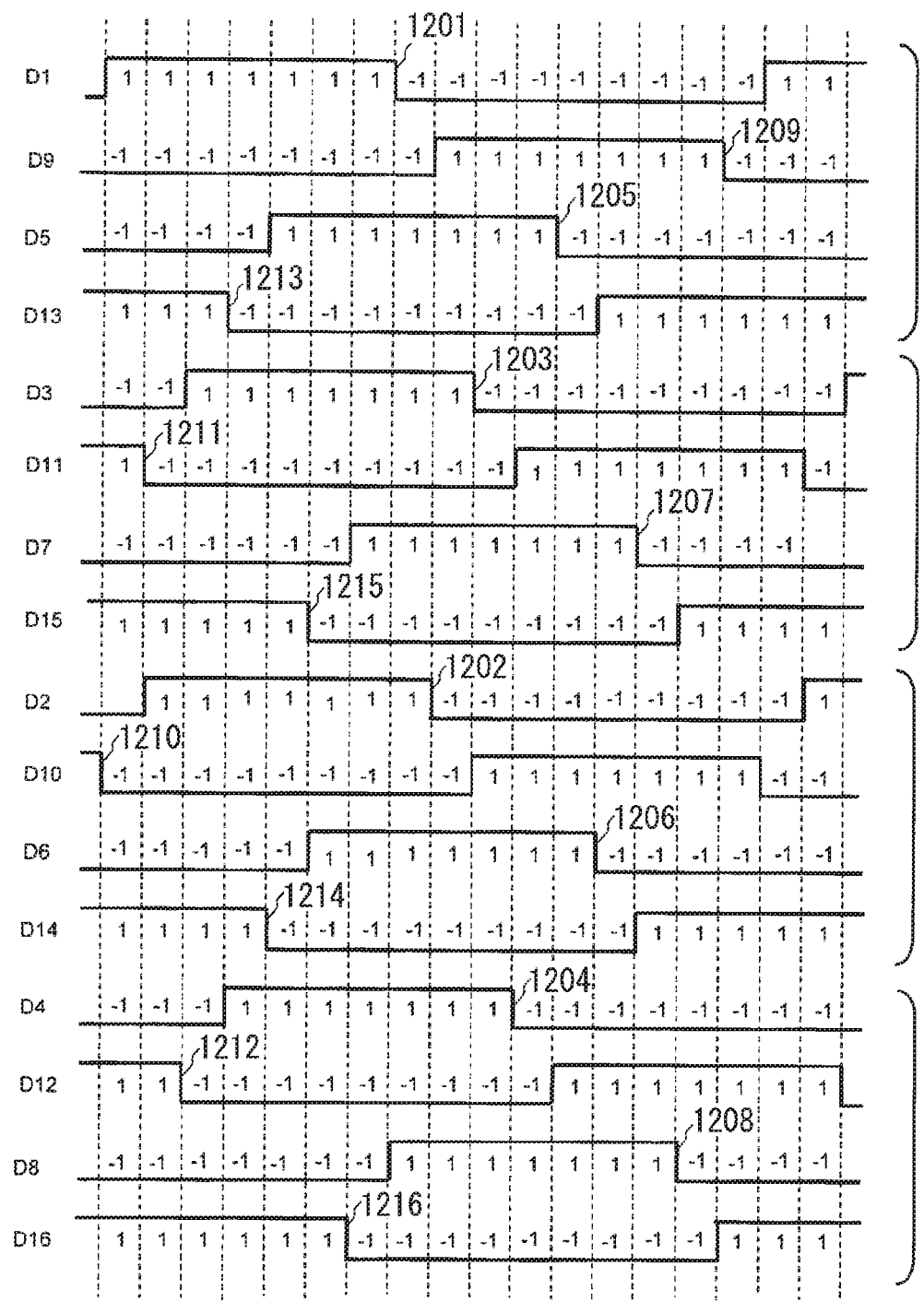
FIG. 13 is a diagram illustrating one sequence of 16 phases based on the n rank matrix according to the second embodiment.

The configuration of such a differential output can also be extended to eight or more phases. In the case of 12 phases, as illustrated in FIG. 12, the light receiving device is driven by a sequence of drive waveforms 1101 to 1112. In the case of 16 phases, as illustrated in FIG. 13, the light receiving device is driven by the sequence of drive waveforms 1201 to 1216. Furthermore, the present disclosure can also be applied to phases more than those phases and phases between those phases.

However, in those cases, even if a circuit for correcting the error described above as illustrated in FIG. 11 is added, a path of a series of signals from the light receiving device 46 to the AD conversion circuit 50 has to still deal signals of about 2/n (¼ in FIG. 10, ⅙ in FIG. 12, ⅛ in FIG. 13) of the background light in addition to the modulated light. In view of that point, there is no particular problem in an environment where the background light is not intense, but in an environment where the background light is very intense, the signal path is saturated and even if the circuit for correcting the error as illustrated in FIG. 11 is provided, there is a possibility that a correct result cannot be obtained. As a configuration for reducing this problem, there is the following configuration.

Figure 14:
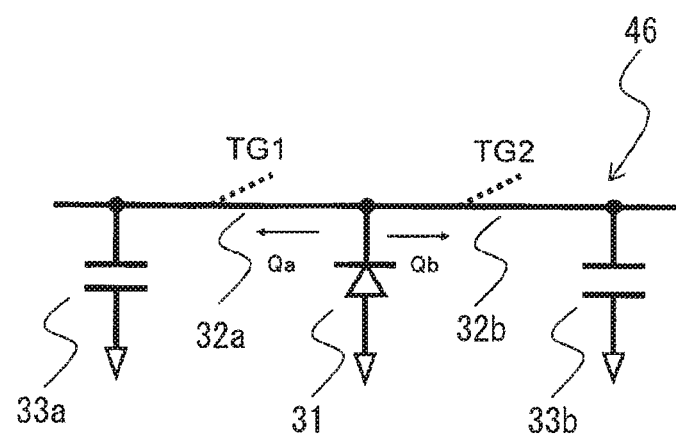
FIG. 14 is a diagram illustrating a first configuration for realizing the discarding of charges from a pixel.
Figure 14:
Figure 14:
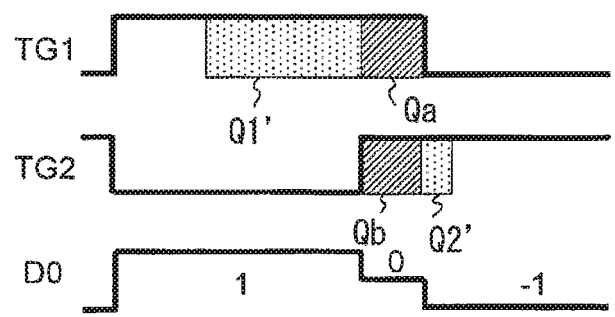

In other words, as means for preventing the problem of saturation of the signal path, operation illustrated in FIG. 14 is newly added to define a third state in addition to "1" and "−1". In FIG. 14, a third state is realized with the provision of a period in which the modulation switches 32*a* and 32*b* are simultaneously closed, that is, a period in which both TG1 and TG2 are "H". In a period where both of TG1 and TG2 become "H", charges generated in the PD 31 are divided into Qa and Qb and stored in the storage capacitors 33*a* and 33*b*, respectively. Unless the above-mentioned mismatch is taken into consideration, Qa and Qb have the same value. For that reason, the component is canceled by the CM component removal circuit 47 and the differential detection circuit 49, as a result of which the AD conversion circuit 50 outputs "0". Hereafter, this state is expressed as "0". Even in the case where the above-mentioned mismatch is present, the influence can be avoided by subtracting the Dx exposed with the reversed TG in the same manner disclosed in U.S. Pat. No. 7,462,808 B2.

With use of the state of "0" newly defined in this manner, a sequence of reducing the influence of the background light can be provided. In the sequence illustrated in FIG. 15 includes (n−4) sequences in which a period of [(n/2)−1] is set to "1" with respect to the modulation period Tm, two periods are set to "0", and a period of [(½)n−1] is set to "−1", and four sequences in which a period of [(n/2)−1] is set to "1", one period is set to "0", and a period of (½)n is set to "−1.". With the deformation of the sequence in this manner, the background light can be greatly removed by the CM component removal circuit 47 except for the last 4 cycles. Therefore, even in an environment where the background light is very intense, the distance can be calculated without being influenced by the saturation except for the last one distance measurement and waveform monitor information. Also, the influence of the components of the background light affecting the last one distance calculation is halved as compared with the case of FIG. 10.

Figure 15:
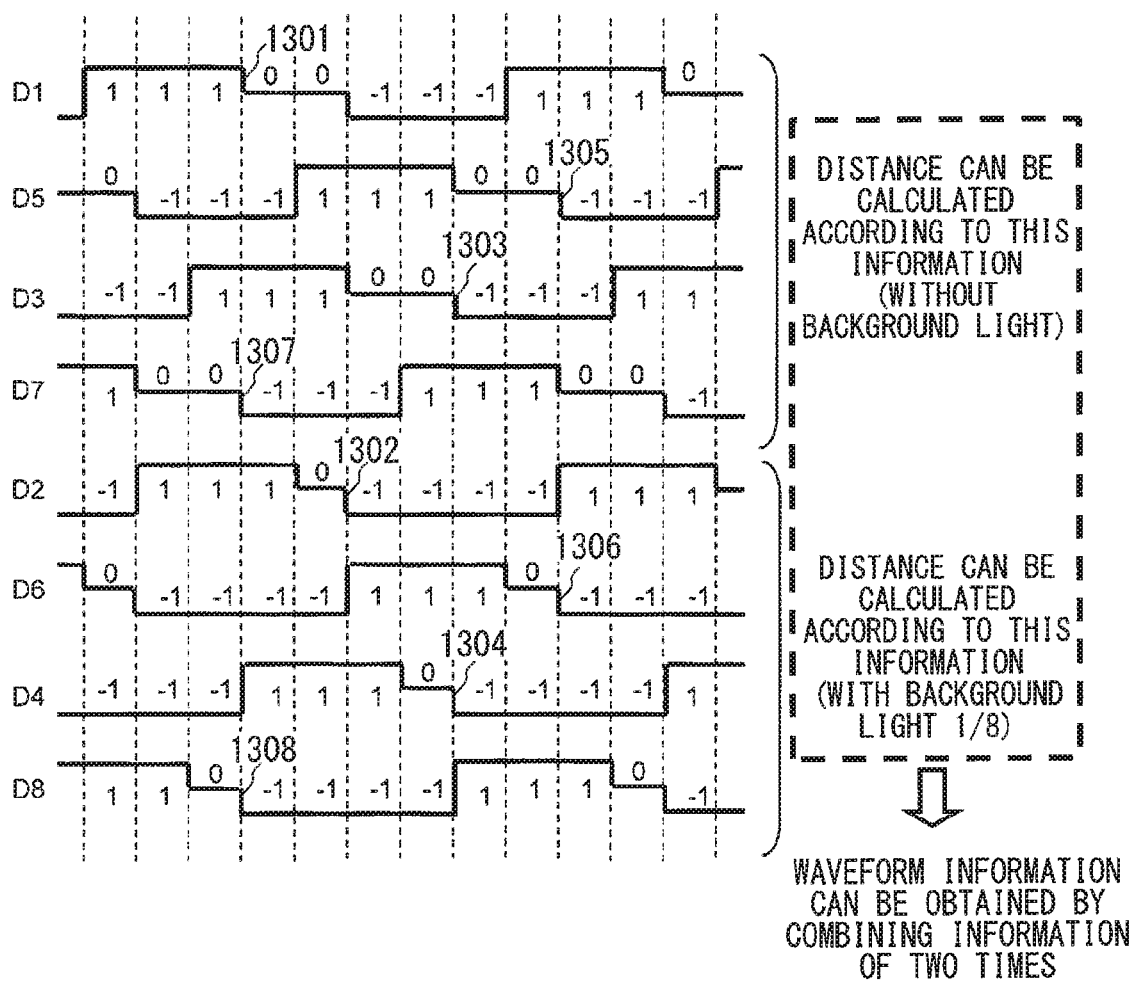
FIG. 15 is a diagram illustrating another sequence of 8 phases based on the n rank matrix according to the second embodiment.
Figure 16:
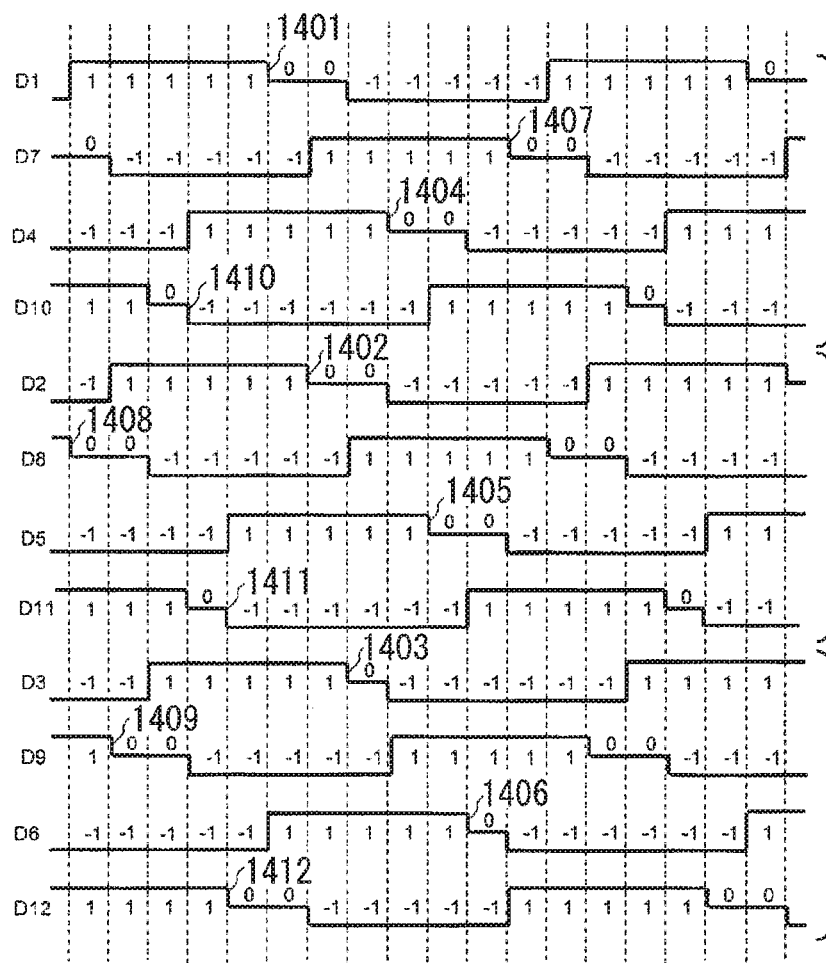
FIG. 16 is a diagram illustrating another sequence of 12 phases based on the n rank matrix according to the second embodiment.
Figure 17:
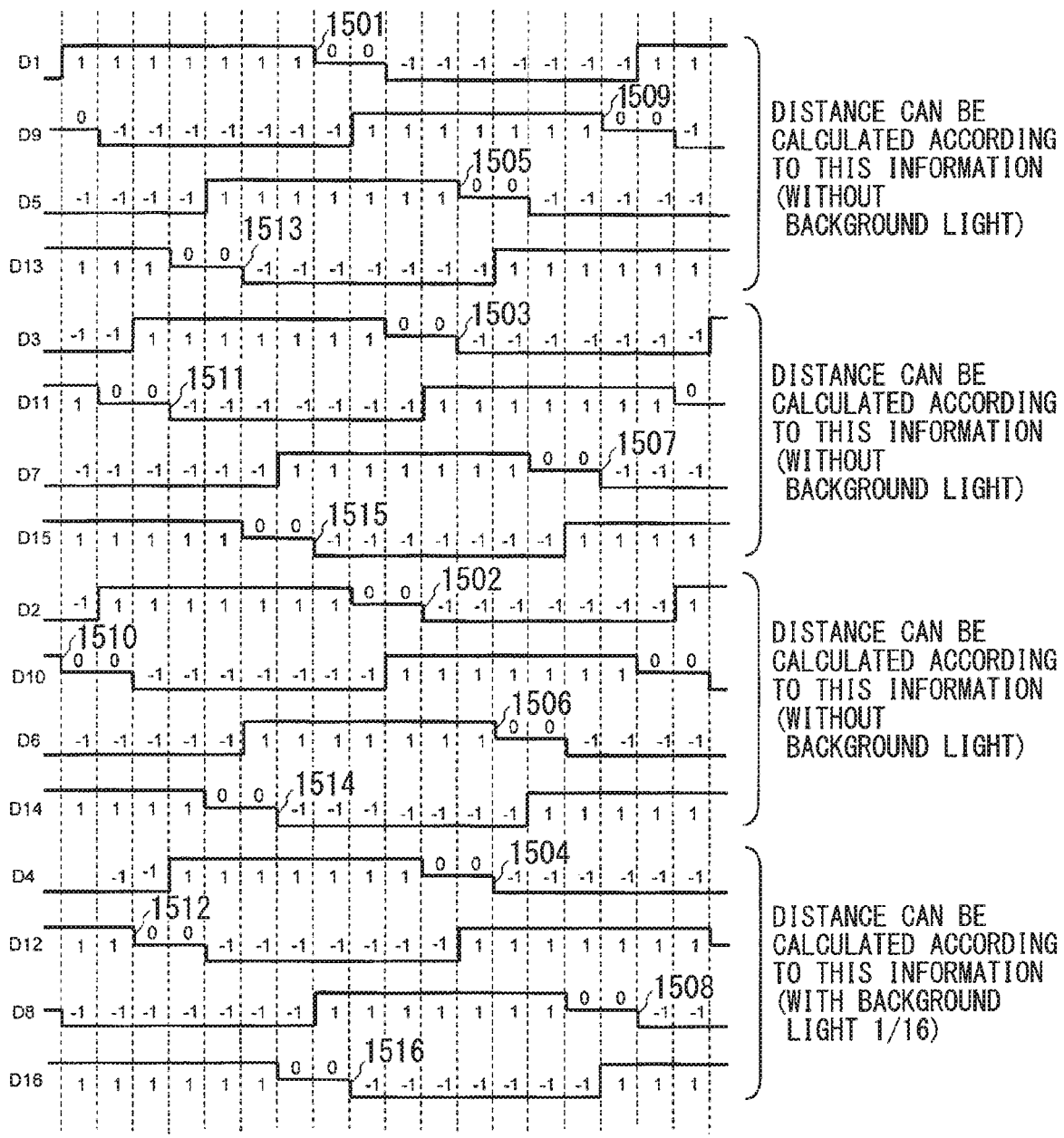
FIG. 17 is a diagram illustrating another sequence of 16 phases based on the n rank matrix according to the second embodiment.
Figure 18:
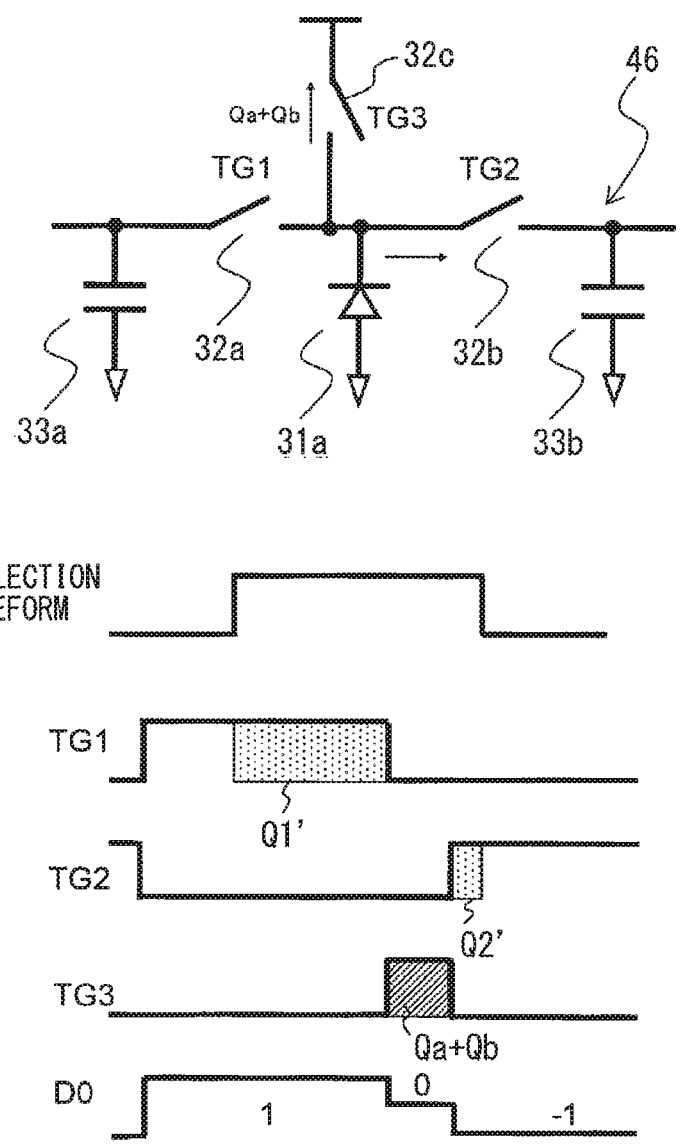
FIG. 18 is a diagram illustrating a second configuration for realizing the discarding of charges from a pixel.
Figure 19:
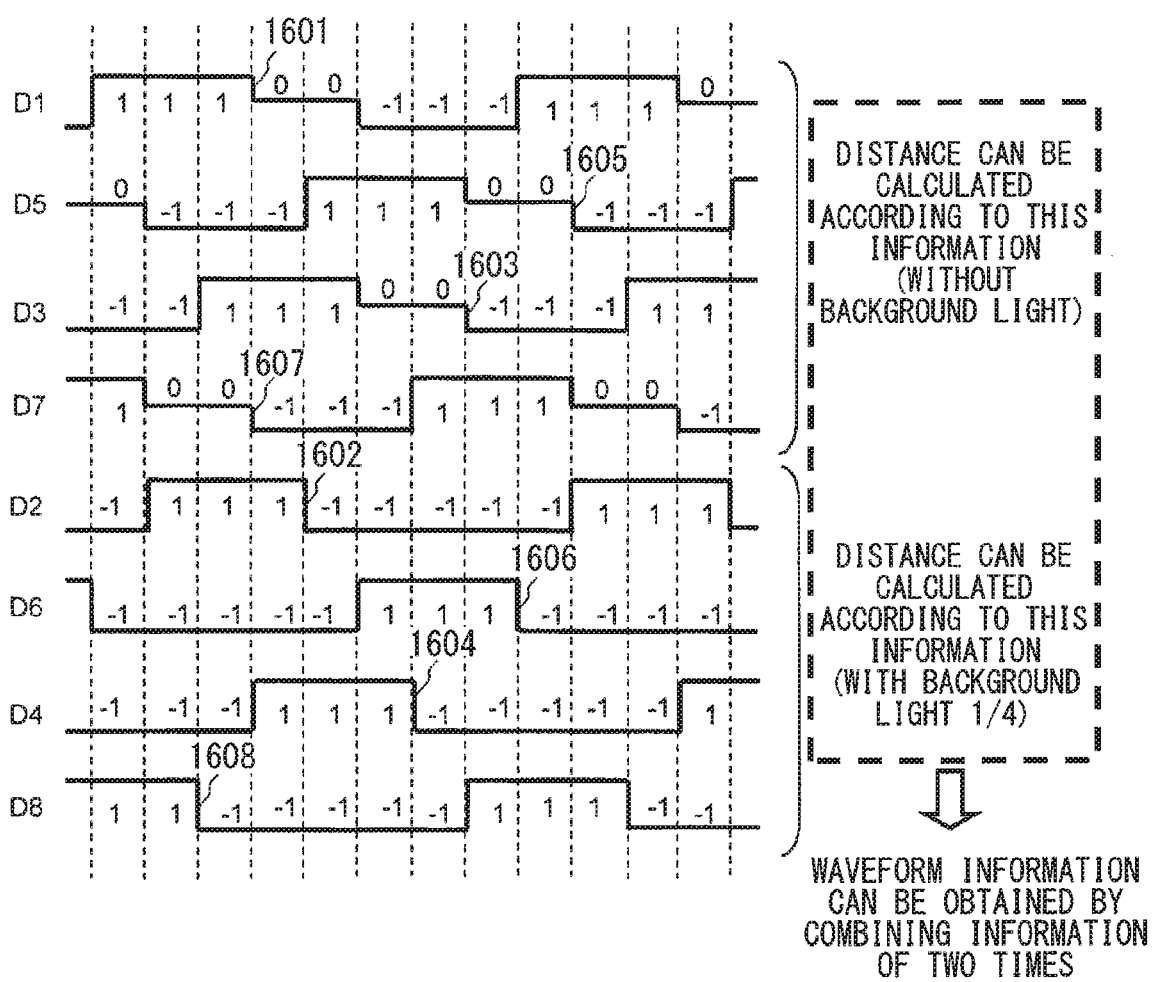
FIG. 19 is a diagram illustrating still another sequence of 8 phases based on the n rank matrix according to the second embodiment.

In this case as well, the phases can be expanded to eight or more phases. In the case of 12 phases, as illustrated in FIG. 16, the light receiving device is driven by a sequence of drive waveforms 1401 to 1412. In the case of 16 phases, as illustrated in FIG. 17, the light receiving device is driven by a sequence of the drive waveforms 1501 to 1516. Furthermore, the present disclosure can also be applied to phases more than those phases and phases between those phases. Further, the configuration in which the AD conversion circuit 50 outputs "0" may be different from the configuration illustrated in FIG. 14. In other words, in FIG. 14, the configuration in which the AD conversion circuit 50 outputs "0" by closing TG and TG2 at the same time is realized. Alternatively, as illustrated in FIG. 18, a third switch 32*c* (another switch) different from the modulation switches 32*a* and 32*b* may be provided to discard unused charges to a fixed potential (for example, VDD). In FIG. 15, in order to obtain a matrix with the rank n, only one "0" is provided for the latter four sequences, but the same as that in FIG. 10 can be applied to the latter four sequences. In other words, a sequence illustrated in FIG. 19 may be used. Also, in this case, the phases can be expanded to eight or more phases and can be expanded to 12 phases or 16 phases. Furthermore, the present disclosure can also be applied to phases more than those phases and phases between those phases.

As described above, according to the second embodiment, the same advantages as those in the first embodiment can be obtained. In addition, with the addition of a configuration that prevents the problem of saturation of the signal path as the configuration of the differential output, the influence of background light can be removed Third Embodiment Next, a third embodiment of the present disclosure will be described. In the first and second embodiments, the sequence based on the n rank matrix is applied to the phase number n. On the other hand, in a third embodiment, a sequence equivalently realized is set by not sampling at 1/n intervals with respect to the modulation period Tm but as a differential (difference) value to employ a matrix of a rank (n−1).

Figure 20:
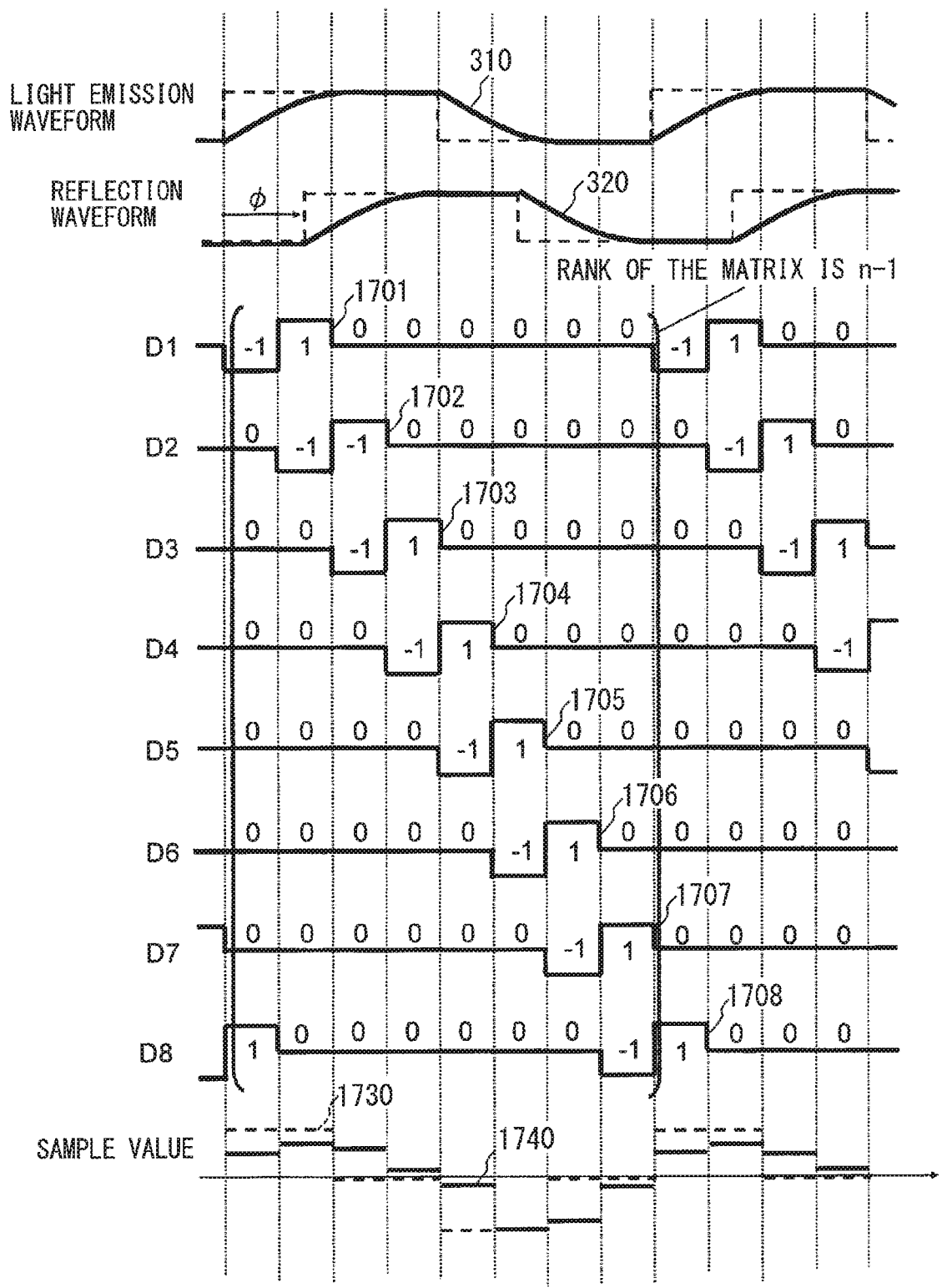
FIG. 20 is a diagram illustrating a sequence for acquiring a differential value according to a third embodiment.

FIG. 20 illustrates a sequence of acquiring a differential value in the case of eight phases. The sequence in which "−1" and "1" are disposed side by side is shifted by (⅛)×360 degrees (generally (1/n)×360 degrees) from the modulation period Tm, to realize sampling of a differential value. The sampling value in the case of an ideal rectangular wave with respect to the reflection waveform 320 is shown as a waveform 1730 and the sampled value in the case where the waveform has a delay is shown as a waveform 1740. Different sampling values can be acquired reflecting the waveform of the reflected wave and the waveform can be monitored. In this situation, since the acquired value is a differential value, the DC component cannot be acquired. However, as described above, even if the configuration of the differential output cannot acquire the DC component, a problem rarely arises in practical use.

When the same idea as that in the first and second embodiments is applied to the above sequence to obtain a rank of an n×n matrix, a rank n−1 is obtained. In other words, even when the rank of the sequence to be applied is smaller than that of the first and second embodiments by "1", the value obtained in the sequence of FIG. 20 can be obtained from the linear operation.

Figure 21:
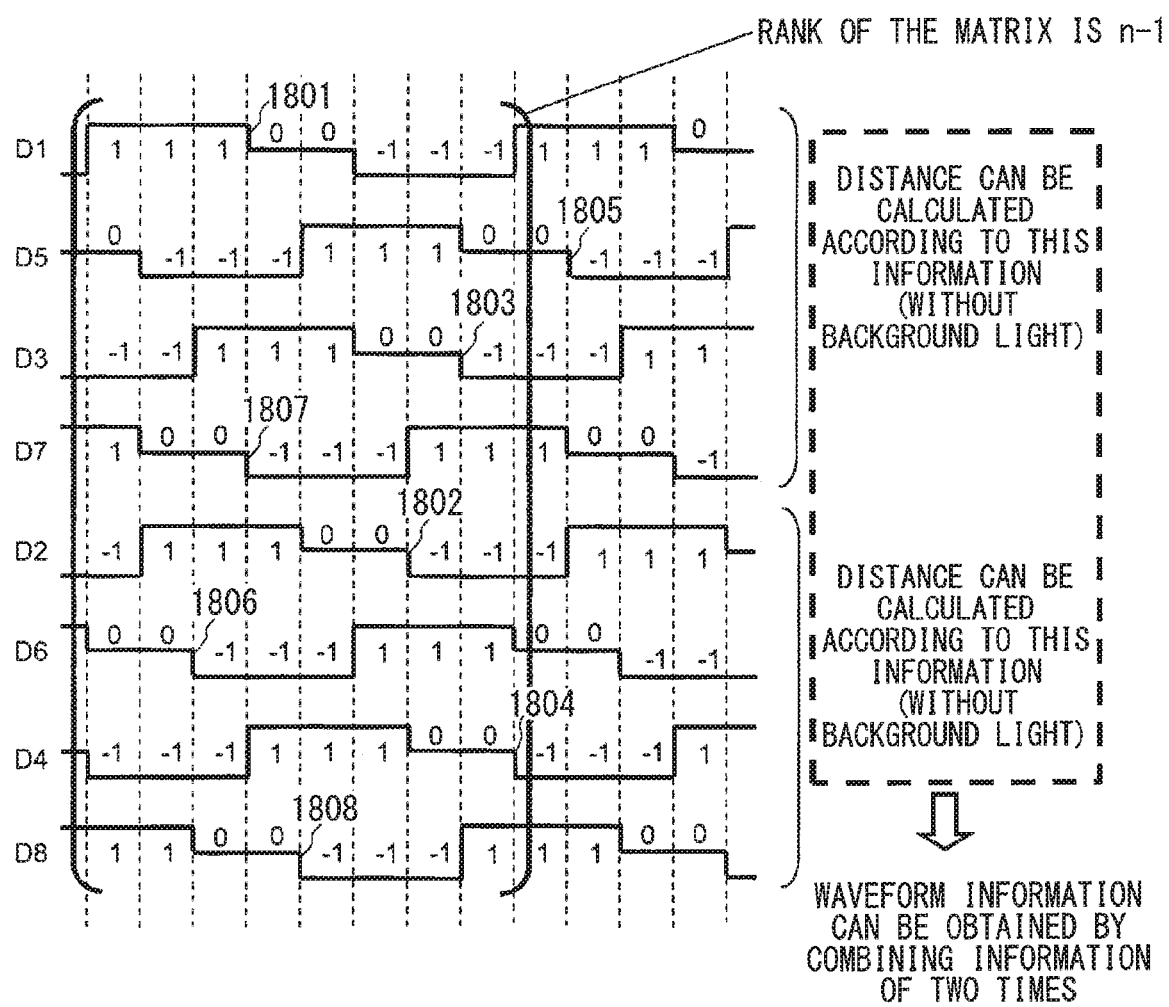
FIG. 21 is a diagram illustrating a sequence of 8 phases based on a matrix of a rank n−1 according to a third embodiment.
Figure 22:
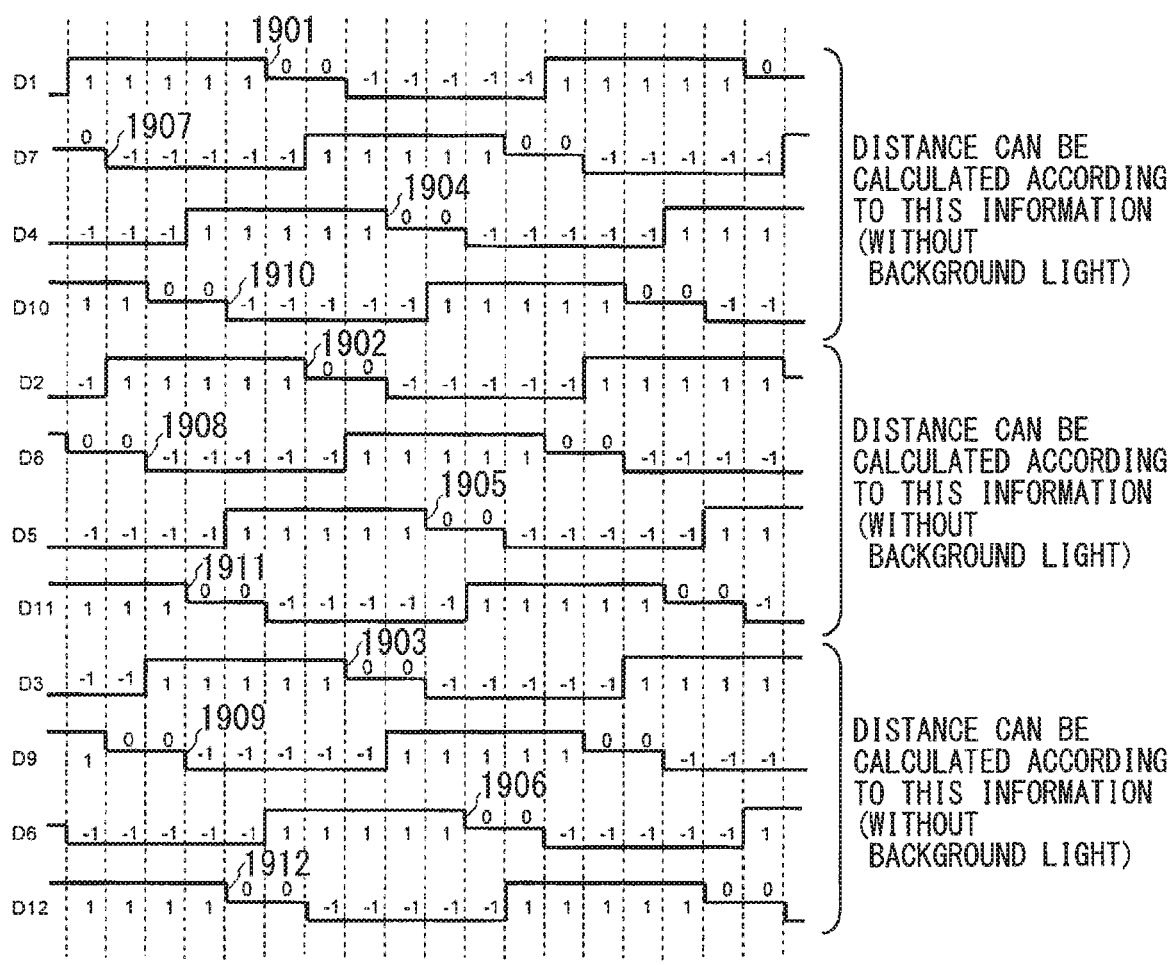
FIG. 22 is a diagram illustrating a sequence of 12 phases based on the n−1 rank matrix according to the third embodiment.

An infinite number of sequences based on the n−1 rank matrix can be considered, but an example in the case of eight phases is illustrated in FIG. 21. This sequence includes n sets of sequences shifted by 1/n phases with one cycle having "1" in a period of [(n/2)−1], "0" in a period of 2, "−1" in a period of [(n/2)−1]. The configurations of FIGS. 14 and 18 described above are conceivable for "0". In this case, since "1" and "−1" of each sequence are perfectly balanced with each other, the component of the background light is almost completely canceled by the CM component removal circuit 47 and is not input to a circuit at a subsequent stage. Therefore, the saturation problem described in the second embodiment can be avoided. Also in this case, the distance can be calculated for every two samples or every four samples, and the phases can be expanded to eight or more phases.

According to the third embodiment described above, in the time-of-flight distance measurement device 41, the light receiving device 46 is driven by a sequence having the matrix of the phase number n, a value sampled on the basis of the n−1 rank matrix with respect to the phase number n is linearly calculated, and a waveform equivalent to the differential waveform sampled in the 1/n step is detected. As a result, a linear operation is performed on a sampled value based on a matrix of a rank n−1 with respect to a phase number n, thereby being capable of restoring a waveform equivalent to a differential waveform sampled in 1/n steps, and being capable of determining whether the shape of the light emission waveform is normal, or not, as in the first and second embodiments.

Figure 23:
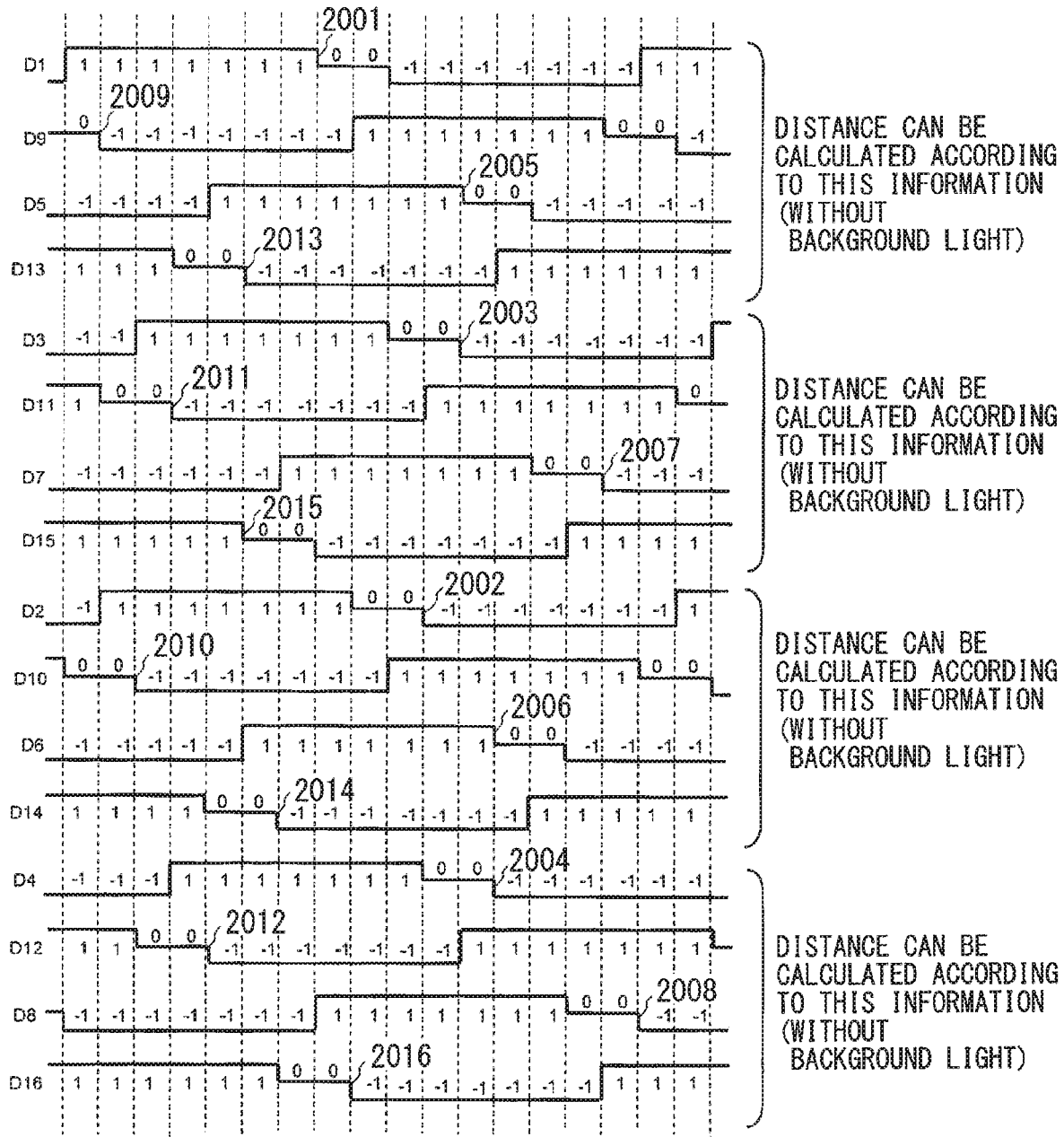
FIG. 23 is a diagram illustrating a sequence of 16 phases based on the n−1 rank matrix according to the third embodiment.
Figure 24:
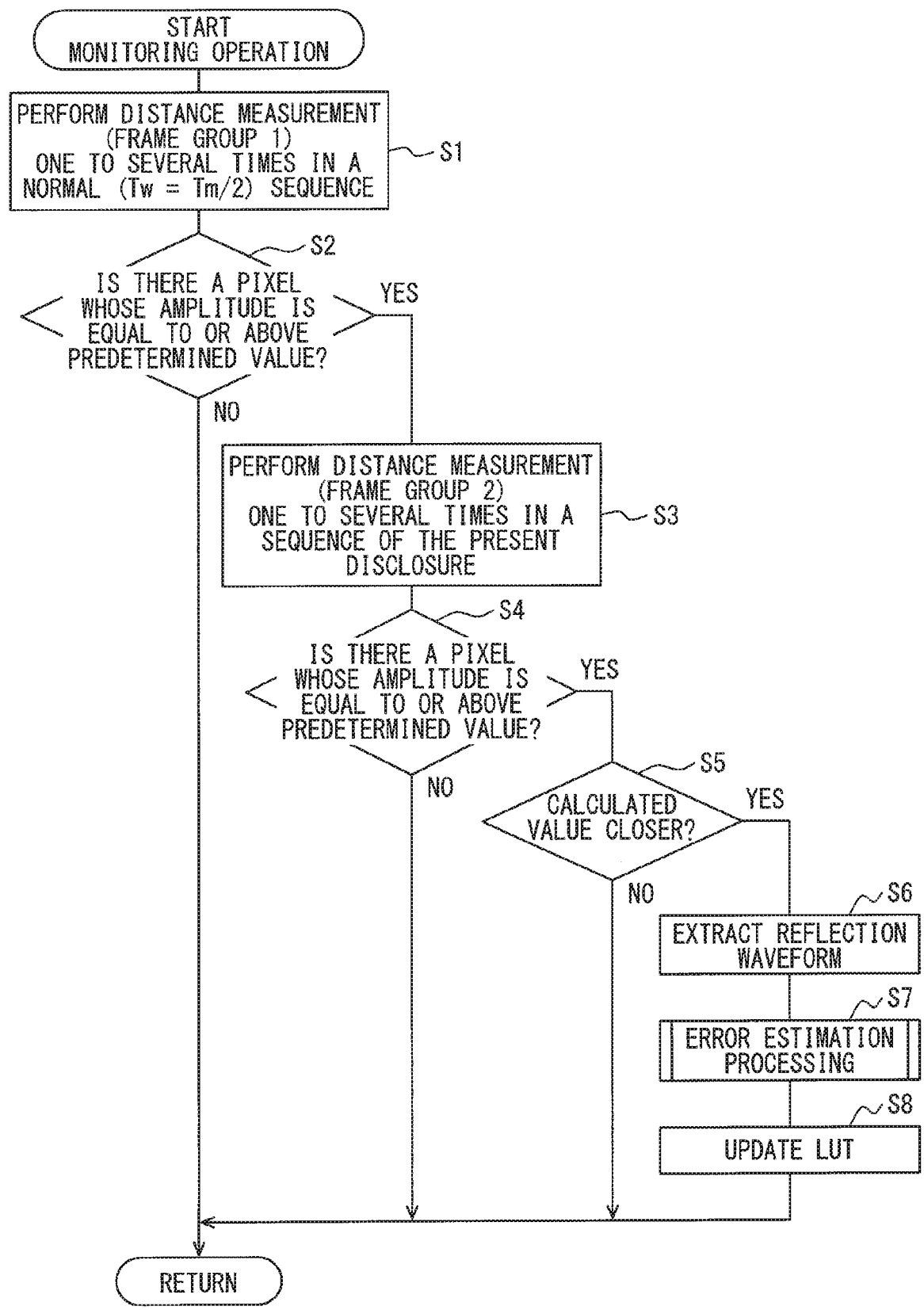
FIG. 24 is a diagram illustrating a flowchart.
Figure 25:
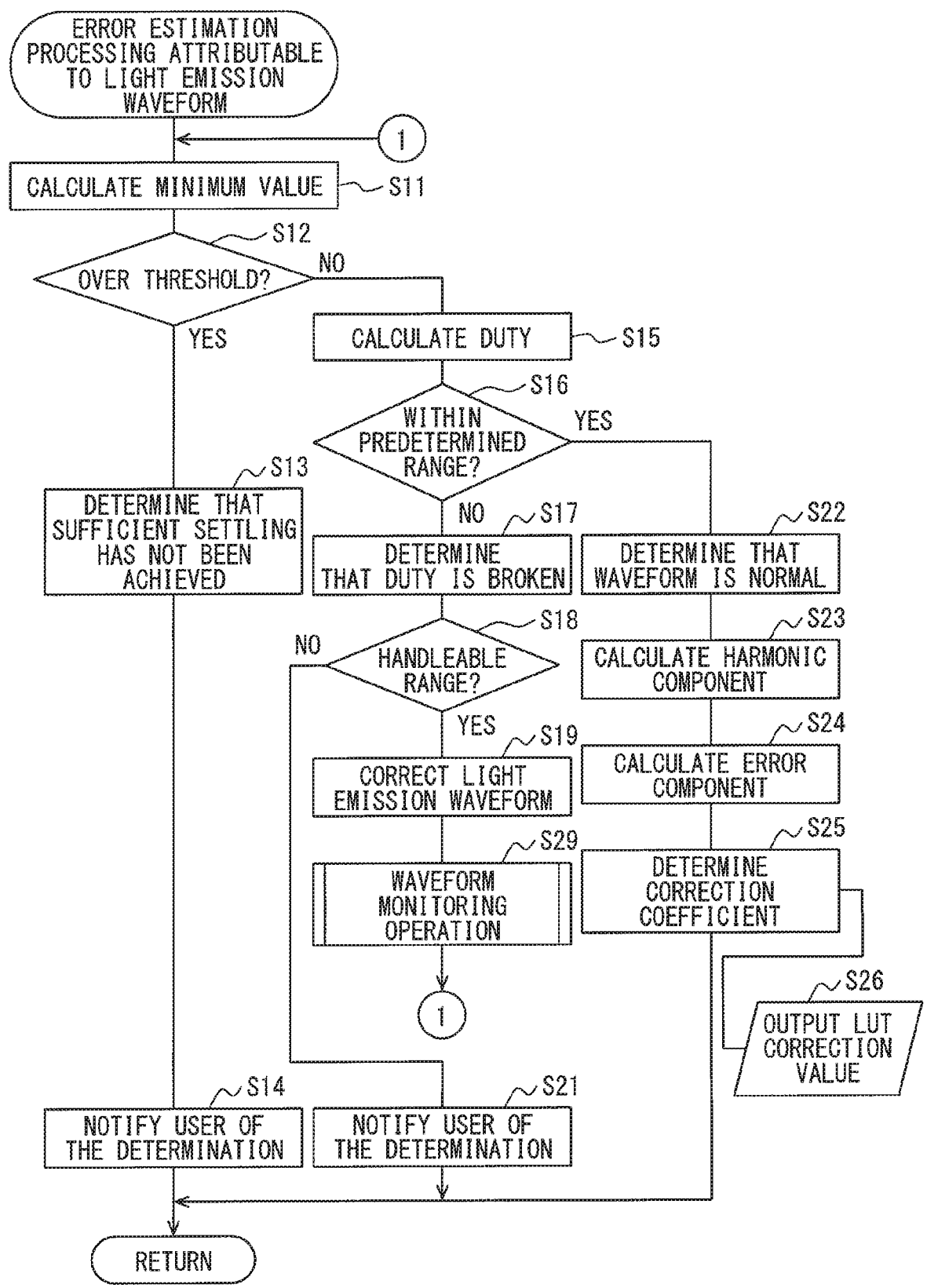
FIG. 25 is a diagram illustrating a flowchart.

In the first to third embodiments described above, a control for realizing the monitoring operation during an actual distance measurement will be described with reference to FIGS. 23 and 24.

The time-of-flight distance measurement device 1 first performs a distance measurement one to several times in a normal sequence (shown in FIG. 9, for example) (frame group 1) (S1). The time-of-flight distance measurement device 1 determines whether there is a pixel whose amplitude of reflected light is equal to or larger than a predetermined value, or not, on the basis of the distance measurement result (S2). When the time-of-flight distance measurement device 1 determines that there is no pixel whose amplitude of the reflected light is equal to or larger than the predetermined value (no in S2), the time-of-flight distance measurement device 1 completes the monitoring operation.

On the other hand, when the time-of-flight distance measurement device 1 determines that there is a pixel whose amplitude of the reflected light is equal to or larger than the predetermined value (yes in S2), the time-of-flight distance measurement device 1 switches from a normal sequence to the sequence of the present disclosure, and performs the distance measurement one to several times (frame group 2) (S3). Similarly, the time-of-flight distance measurement device 1 determines whether there is a pixel whose amplitude of the reflected light is equal to or larger than a predetermined value, or not, on the basis of the distance measurement result (S4). When the time-of-flight distance measurement device 1 determines that there is no pixel whose amplitude of reflected light is equal to or larger than the predetermined value (no in S4), the time-of-flight distance measurement device 1 completes the monitoring operation.

On the other hand, when the time-of-flight distance measurement device 1 determines that there is a pixel whose amplitude of the reflected light is equal to or larger than the predetermined value (yes in S4), the time-of-flight distance measurement device 1 determines whether calculated values are close to each other for every four groups (a difference of the calculated values is smaller than a predetermined value), or not, and determines whether the target object or the subject device is traveling, or not (S5). When the time-of-flight distance measurement device 1 determines that the calculated values are not close to each other among every four groups, that is, that the target object or the subject device is traveling (no in S5), the time-of-flight distance measurement device 1 completes the monitoring operation. When the time-of-flight distance measurement device 1 determines that the calculated values are close to each other for every four groups, that is, the target object or the subject device is not traveling (stationary) (yes in S5), the time-of-flight distance measurement device 1 extracts the reflection waveform (S6), and proceeds to error estimation processing caused by the light emission waveform (S7).

The sequence is thus divided between the normal frame (frame group 1) and the frame (frame group 2) of the present disclosure (for monitoring), thereby being capable of avoiding a decrease in SNR. However, in the case where the decrease in SNR is not particularly a problem when the phase number n is large, the intensity of the reflected light is sufficiently large, or the like, the sequence of the present disclosure may be applied to the frame group 1, that is, the distance measurement may be performed one to several times in the sequence of the present disclosure from the first time. The time-of-flight distance measurement device 1 estimates the error with respect to the extracted reflection waveform. The error obtained by estimation is stored in an LUT as in the conventional art, thereby being capable of correcting a value of the distance for every four samples with the use of the error.

When the time-of-flight distance measurement device 1 starts error estimation processing attributable to the light emission waveform, the time-of-flight distance measurement device 1 calculates a minimum value of the differential value of the acquired value (S11) and determines whether a difference between the values exceeds a threshold, or not (S12). In the case of the first and second embodiments, the above differential value is a value obtained from two adjacent sampling values, which is a value itself calculated in the third embodiment. When the time-of-flight distance measurement device 1 determines that the difference between the values exceeds the threshold (yes in S12), the time-of-flight distance measurement device 1 determines that the waveform has not been sufficiently settled (S13), outputs an alarm to notify the user of the possibility of malfunction (S14), and completes the error estimation processing attributable to the light emission waveform. The time-of-flight distance measurement device 1 notifies the user of the possibility of malfunction, thereby being capable of prompting inspection and the replacement of parts. In addition, in a configuration having a mechanism in which the drive circuit 43 corrects such a settling error with the use of the above information, an improvement in the reflection waveform can be attempted by feeding back the result to the mechanism.

On the other hand, if the time-of-flight distance measurement device 1 determines that the difference of the values does not exceed the threshold (no in S12), the time-of-flight distance measurement device 1 sums the values in positive periods of the waveform together to calculate the duty cycle (S15). In that case, in the first and second embodiments, the time-of-flight distance measurement device 1 directly obtains an integral value of the waveform to calculate the duty cycle, and in the third embodiment, the time-of-flight distance measurement device 1 performs integration twice to calculate the duty cycle. In that case, the DC component of the incident light cannot be detected, but since the duty cycle of the modulated light emitted from the light emitting device 44 is necessary, there is particularly no problem. The time-of-flight distance measurement device 1 determines whether the duty cycle falls within a predetermined range, or not (S16), and when it is determined that the duty cycle does not fall within the predetermined range (no in S16), the time-of-flight distance measurement device 1 determines that the duty cycle is broken (S17). The time-of-flight distance measurement device 1 determines whether the duty cycle falls within the range that can be handled by a correction function of the drive circuit 43 that drives the light emitting device 44 (S18). When the time-of-flight distance measurement device 1 determines that the duty cycle falls within the range that can be handled by a correction function of the drive circuit 43 (yes in S18), the time-of-flight distance measurement device 1 corrects the light emission waveform (S19), performs the waveform monitoring operation (yes in S20), returns to Step S11 described above, and again performs the processing of Step S11 and subsequent steps.

On the other hand, when the time-of-flight distance measurement device 1 determines that the duty cycle falls outside the range that can be handled by the correction function of the drive circuit 43 (no in S18), the time-of-flight distance measurement device 1 similarly in this case outputs an alarm to notify the user of the possibility of malfunction (S21), and completes the error estimation processing attributable to the light emission waveform.

In this manner, the time-of-flight distance measurement device 1 inspects the characteristics of the waveform such as the settling and the duty cycle, and calculates the harmonic and the waveform distortion from a discrete Fourier transform and an integral value when the acquired value can be determined to be normal. In other words, when it is determined that the duty cycle falls within the predetermined range (yes in S16), the time-of-flight distance measurement device 1 determines that the light emission waveform is normal (S22), performs the discrete Fourier transform to calculate the harmonic component (S23), and calculates an error component attributable to the waveform distortion from the integral value (S24).

The time-of-flight distance measurement device 1 determines a correction coefficient according to the harmonic component and the distortion (S25), updates the correction value of the LUT in the same manner as in the conventional art, and completes the error estimation processing caused by the light emission waveform. As a result, the time-of-flight distance measurement device 1 can reduce an error of the measurement distance attributable to a change in the light emission waveform. Incidentally, the technique for correcting the light emission waveform is described in, for example, JP-A-2012-209380, and the present disclosure and the technique can be used in combination without contradiction.

The present disclosure is not limited to only the above embodiments, but can be modified or expanded as follows.

The present disclosure may be applied to an intended purpose other than the vehicle.

The invention claimed is:

1. A time-of-flight distance measurement device comprising:
a light emitting device that emits a modulated light toward a space, the modulated light being modulated in a pattern having a repetitive period;
a light receiving device that distributes a charge to a plurality of storage capacitors to store the charge, the charge corresponding to an incident light including a reflected light obtained by reflecting the modulated light on a target object;
a control unit controls the light receiving device; and
a signal processing unit that calculates a distance from a subject device to the target object by using a value sampled by the light receiving device, wherein
the control unit drives the light receiving device according to a sequence having a matrix of a phase number n (n being a natural number); and
the signal processing unit linearly calculates the value sampled by the light receiving device based on a rank n matrix with respect to the phase number n, and detects a waveform equivalent to a waveform sampled at a 1/n step.

2. The time-of-flight distance measurement device according to claim 1, wherein
the light receiving device includes two modulation switches and two of the storage capacitors, and
the control unit drives the light receiving devices by using n kinds of pulses and driving the modulation switches for each pair of pulses that are shifted by a half cycle of a modulation period.

3. The time-of-flight distance measurement device according to claim 2, wherein
unit periods are defined as periods obtained by dividing the modulation period by the phase number n, and
the control unit uses n sequences, which are shifted from each other by the unit period with respect to the modulation period, to drive the light receiving device, such that $((n/2)-1)$ sections of the unit periods are H and $((n/2)+1)$ sections of the unit periods are L.

4. The time-of-flight distance measurement device according to claim 2, wherein
unit periods are defined as periods obtained by dividing the modulation period by the phase number n, and
the control unit uses n sequences, which are shifted from each other by the unit period with respect to the modulation period, to drive the light receiving device, such that $((n/2)-1)$ sections of the unit periods are L and $((n/2)+1)$ sections of the unit periods are H.

5. The time-of-flight distance measurement device according to claim 2, wherein
the control unit sets the phase number n to be a multiple of 4, and
the signal processing unit calculates the distance from the subject device to the target object with the use of four values sampled by the light receiving device.

6. The time-of-flight distance measurement device according to claim 1, wherein
the light receiving device includes two modulation switches and two of the storage capacitors, and is configured as a differential output,
unit periods are defined as periods obtained by dividing the modulation period by the phase number n, and
the control unit uses n sequences, which are shifted from each other by the unit period with respect to the modulation period, such that:
the unit periods are 1 when a control signal of a first modulation switch is on and a control signal of a second modulation switch is off, and
the unit periods are −1 when the control signal of the first modulation switch is off and the control signal of the second modulation switch is on.

7. The time-of-flight distance measurement device according to claim 6, wherein
the control unit drives the light receiving device so as to set $((n/2)-1)$ sections of the unit periods to 1 and set $((n/2)+1)$ sections of the unit periods to −1.

8. The time-of-flight distance measurement device according to claim 6, wherein
the control unit sets the phase number n to be a multiple of 4, and
the signal processing unit calculates the distance from the subject device to the target object with the use of four values sampled by the light receiving device.

9. The time-of-flight distance measurement device according to claim 6, further comprising:
a common mode component removing unit that removes a common mode component.

10. The time-of-flight distance measurement device according to claim 1, wherein
the light receiving device includes two modulation switches and two of the storage capacitors, and is configured as a differential output,
unit periods are defined as periods obtained by dividing the modulation period by the phase number n, and
the control unit uses n sequences, which are shifted from each other by the unit period with respect to the modulation period, such that:
the unit periods are 1 when a control signal of a first modulation switch is on and a control signal of a second modulation switch is off,
the unit periods are −1 when the control signal of the first modulation switch is off and the control signal of the second modulation switch is on, and
the unit periods are 0 when the control signal of the first modulation switch is on and the control signal of the second modulation switch is on.

11. The time-of-flight distance measurement device according to claim 10, wherein
the control unit sets the phase number n to be a multiple of 4, and
the control unit drives the light receiving device such that:
for (n−4) of the sequences, ((n/2)−1) sections of the unit periods are set to 1, 2 sections of the unit periods are set to 0, and ((n/2)−1) sections of the unit periods are set to −1, and
for the remaining 4 sequences, ((n/2)−1) sections of the unit periods are set to 1, 1 section of the unit periods is set to 0, and (n/2) of the unit periods are set to −1.

12. The time-of-flight distance measurement device according to claim 10, wherein
the control unit sets the phase number n to be a multiple of 4, and
the control unit drives the light receiving device such that:
for (n−4) of the sequences, ((n/2)−1) sections of the unit periods are set to 1, 2 sections of the unit periods are set to 0, and ((n/2)−1) sections of the unit periods are set to −1, and
for the remaining 4 sequences, ((n/2)−1) sections of the unit periods are set to 1 and ((n/2)+1) sections of the unit periods are set to −1.

13. The time-of-flight distance measurement device according to claim 10, further comprising:
a common mode component removing unit that removes a common mode component.

14. The time-of-flight distance measurement device according to claim 1, wherein
the light receiving device includes two modulation switches, two of the storage capacitors, and another switch different from the modulation switches, and is configured as a differential output,
unit periods are defined as periods obtained by dividing the modulation period by the phase number n, and
the control unit uses n sequences, which are shifted from each other by the unit period with respect to the modulation period, such that:
the unit periods are 1 when a control signal of a first modulation switch is on, a control signal of a second modulation switch is off, and a control signal of the other switch is off,
the unit periods are −1 when the control signal of the first modulation switch is off, the control signal of the second modulation switch is on, and the control signal of the other switch is off, and
the unit periods are 0 when the control signal of the first modulation switch is off, the control signal of the second modulation switch is off, and the control signal of the other switch is on.

15. The time-of-flight distance measurement device according to claim 1, wherein
the control unit drives the light receiving device according to a sequence based on a matrix having a rank of a phase number n when there is a pixel in which an amplitude of the reflected light is equal to or more than a predetermined value.

16. A time-of-flight distance measurement device comprising:
a light emitting device that emits a modulated light toward a space, the modulated light being modulated in a pattern having a repetitive period;
a light receiving device that distributes a charge to a plurality of storage capacitors to store the charge, the charge corresponding to an incident light including a reflected light obtained by reflecting the modulated light on a target object;
a control unit controls the light receiving device; and
a signal processing unit that calculates a distance from a subject device to the target object by using a value sampled by the light receiving device, wherein
the control unit drives the light receiving device according to a sequence having a matrix of a phase number n (n being a natural number); and
the signal processing unit linearly calculates the value sampled by the light receiving device based on a rank (n−1) matrix with respect to the phase number n, and detects a waveform equivalent to a differential waveform sampled at a 1/n step.

17. The time-of-flight distance measurement device according to claim 16, wherein
the light receiving device includes two modulation switches and two of the storage capacitors, and is configured as a differential output,
unit periods are defined as periods obtained by dividing the modulation period by the phase number n, and
the control unit uses n sequences, which are shifted from each other by the unit period with respect to the modulation period, such that:
the unit periods are 1 when a control signal of a first modulation switch is on and a control signal of a second modulation switch is off,
the unit periods are −1 when the control signal of the first modulation switch is off and the control signal of the second modulation switch is on, and
the unit periods are 0 when the control signal of the first modulation switch is on and the control signal of the second modulation switch is on.

18. The time-of-flight distance measurement device according to claim 16, wherein
the light receiving device includes two modulation switches, two of the storage capacitors, and another switch different from the modulation switches, and is configured as a differential output, unit periods are defined as periods obtained by dividing the modulation period by the phase number n, and the control unit uses n sequences, which are shifted from each other by the unit period with respect to the modulation period, such that:

the unit periods are 1 when a control signal of a first modulation switch is on, a control signal of a second modulation switch is off, and a control signal of the other switch is off, the unit periods are −1 when the control signal of the first modulation switch is off, the control signal of the second modulation switch is on, and the control signal of the other switch is off, and the unit periods are 0 when the control signal of the first modulation switch is off, the control signal of the second modulation switch is off, and the control signal of the other switch is on.

19. The time-of-flight distance measurement device according to claim 16, wherein the control unit sets the phase number n to be a multiple of 4, and the signal processing unit calculates the distance from the subject device to the target object with the use of four values sampled by the light receiving device.

20. The time-of-flight distance measurement device according to claim 16, further comprising:

a common mode component removing unit that removes a common mode component.

21. The time-of-flight distance measurement device according to claim 16, wherein the control unit drives the light receiving device according to a sequence having a matrix having a rank of a phase number n−1 when there is a pixel in which an amplitude of the reflected light is equal to or more than a predetermined value.

22. The time-of-flight distance measurement device according to claim 16, wherein the control unit corrects the waveform of the modulated light emitted from the light emitting device according to a result of monitoring the waveform of the reflected light.

23. The time-of-flight distance measurement device according to claim 22, wherein the control unit outputs an alarm when the waveform of the modulated light emitted from the light emitting device is uncorrectable.

24. The time-of-flight distance measurement device according to claim 22, wherein the control unit outputs an alarm when the waveform of the reflected light after correcting the waveform of the modulated light emitted from the light emitting device is abnormal.

* * * * *